US009784877B2

United States Patent
Tompkins et al.

(10) Patent No.: US 9,784,877 B2
(45) Date of Patent: Oct. 10, 2017

(54) MATTER DETECTOR, SENSOR AND LOCATOR DEVICE AND METHODS OF OPERATION

(71) Applicant: avaSensor, LLC, Powell, TN (US)

(72) Inventors: Fred D. Tompkins, Powell, TN (US); John B. Wilkerson, Knoxville, TN (US); Arpad A. Vass, Oak Ridge, TN (US); Timothy R. Hutchison, Powell, TN (US)

(73) Assignee: AvaSensor, LLC, Powell, TN (US)

( * ) Notice: Subject to any disclaimer, the term of this patent is extended or adjusted under 35 U.S.C. 154(b) by 0 days.

(21) Appl. No.: 15/394,445

(22) Filed: Dec. 29, 2016

(65) Prior Publication Data

US 2017/0160417 A1    Jun. 8, 2017

Related U.S. Application Data

(63) Continuation-in-part of application No. 14/641,213, filed on Mar. 6, 2015, now abandoned.

(Continued)

(51) Int. Cl.
*G01B 7/14* (2006.01)
*G01V 3/08* (2006.01)
(Continued)

(52) U.S. Cl.
CPC ............... *G01V 3/08* (2013.01); *G01V 3/081* (2013.01); *G01V 3/165* (2013.01); *G01V 3/17* (2013.01)

(58) Field of Classification Search
CPC .......... G01V 3/08; G01V 3/081; G01V 3/165; G01V 3/17; G01V 2210/6163;
(Continued)

(56) References Cited

U.S. PATENT DOCUMENTS 3,104,494 A * 9/1963 Clark ...................... A63F 7/382
                                                                273/440
3,662,255 A * 5/1972 Garrett .................... G01V 3/15
                                                                324/328
(Continued)

FOREIGN PATENT DOCUMENTS

AU      WO 8700933 A1 *  2/1987 ............. G01V 3/101
DE          3418426 A1 *  11/1985
(Continued)

OTHER PUBLICATIONS

Nordland, Rod. "Iraq Swears by Bomb Detector U.S. Sees as Useless", Nov. 2009. The New York Times.*
(Continued)

*Primary Examiner* — Patrick Assouad
*Assistant Examiner* — Sean Curtis
(74) *Attorney, Agent, or Firm* — Cameron LLP

(57) ABSTRACT

A detector/sensor/locator device for objects and materials of interest comprises a Faraday cage for containing or suspending a sample object or material of interest. The object or material of interest under principles of quantum theory emits electromagnetic radiation having a unique electromagnetic signature. The Faraday cage may have a cone-shape for channeling emitted electromagnetic waves upward to a barrel having mounted therein an L-shaped antenna element which may be free to rotate horizontally about the barrel or fixed in parallel with a second antenna element of similar length extending from a side of the barrel. The first and second antennae elements cooperate to detect, sense the presence of and locate a target object, the free-to-rotate antenna element capable of pointing in the direction of the target object or material. A magnetometer may be attached to an antenna element and monitored for electromagnetic field strength and/or an oscilloscope may be utilized to display signals taken from antennae coils associated with the (Continued)

barrel. Two magnets may be attached to the antenna elements to enhance the magnetic field. A very low frequency wave may be used to enhance (modulate) the electromagnetic wave radiation generated by the object or material of interest in comparison with a like received electromagnetic wave of unique signature of the object/material of interest.

20 Claims, 21 Drawing Sheets

Related U.S. Application Data

(60) Provisional application No. 61/949,530, filed on Mar. 7, 2014.

(51) Int. Cl.
    *G01V 3/165* (2006.01)
    *G01V 3/17* (2006.01)

(58) Field of Classification Search
    CPC ........ G01V 9/002; G01R 29/08; E21B 47/09; A61B 5/06; A61B 5/4887; A61B 6/12; A61B 6/00
    USPC ............ 324/207.16, 207.26, 207.13, 207.11, 324/207.22, 326–329, 331, 336, 348, 800
    See application file for complete search history.

(56) References Cited

U.S. PATENT DOCUMENTS

| | | | | |
|---|---|---|---|---|
| 3,717,950 A | * | 2/1973 | Venditti | A63F 9/02 446/137 |
| 3,753,185 A | * | 8/1973 | Mahan | G01V 3/15 324/236 |
| 3,875,498 A | * | 4/1975 | Mahan | G01V 3/101 324/328 |
| 3,896,371 A | * | 7/1975 | Hametta | G01V 3/102 324/327 |
| 4,030,026 A | * | 6/1977 | Payne | G01V 3/107 324/239 |
| D245,233 S | * | 8/1977 | Wolfe | D10/46 |
| D248,377 S | * | 7/1978 | Wolfe | D10/46 |
| 4,130,792 A | * | 12/1978 | Sullivan | G01V 3/101 324/236 |
| 4,293,816 A | * | 10/1981 | Johnson | G01V 3/107 324/329 |
| 4,334,192 A | * | 6/1982 | Podhrasky | G01V 3/105 324/329 |
| 8,970,219 B2 | * | 3/2015 | Nel | G01N 27/902 324/326 |
| 2003/0107377 A1 | * | 6/2003 | Uzman | G01V 3/101 324/327 |
| 2005/0146325 A1 | * | 7/2005 | Le Roux | G01R 33/02 324/244 |
| 2008/0094065 A1 | * | 4/2008 | Candy | G01V 3/104 324/329 |
| 2008/0315910 A1 | * | 12/2008 | Goin | G01V 9/002 340/870.31 |
| 2015/0253452 A1 | * | 9/2015 | Tompkins | G01V 9/002 324/207.26 |

FOREIGN PATENT DOCUMENTS

| | | | | |
|---|---|---|---|---|
| GB | 683173 A | * | 11/1952 | ............... A61N 1/16 |
| SE | 200901048 A1 | * | 4/2011 | |

OTHER PUBLICATIONS

Gold Detectors, "L Rods for dowsing", Gold Detectors International, www.golddetectors.gr, copyright 2012.*

Herrman, John. "The Bomb-Sniffing Gadget That's (Definitely Not) Saving Iraq", www.gizmodo.com, Nov. 2009.*

ATSC , "ADE 651: Advanced Detection Equipment—Advanced Tactical Security & Communications UK", Copyright 2007, Cominfo Systems, Inc.*

* cited by examiner

MATTER DETECTOR, SENSOR AND LOCATOR DEVICE AND METHODS OF OPERATION

The present patent application is a continuation-in-part of U.S. patent application Ser. No. 14/641,213 filed Mar. 6, 2015, of the same inventors which claims the benefit of and right of priority to U.S. Provisional Patent Application, Ser. No. 61/949,530 filed Mar. 7, 2014 by the same inventors, both applications incorporated by reference as to their entire contents.

FIELD OF THE INVENTION

The present invention relates generally to the technical field of the detection, sensing of presence and location of matter typically in solid or liquid form by means of a device including at least one antenna where matter may be defined broadly as including but not limited to DNA, metals (ferrous and non-ferrous), precious and semi-precious jewels, flora, gun powder, propellants, explosives, pharmaceuticals and narcotics, nuclear materials, currency in the form of paper currency as well as coin currency, precious, semi-precious and rare earth materials and dielectric and piezoelectric materials and, more particularly, to a device having a chamber portion for placing therein a sample of a certain object or material to be located or approximated and first and second antennae which may be enhanced by magnetic fields or coils for interacting with the object sample and for detecting, sensing the presence of and locating matter like the object sample.

BACKGROUND OF THE INVENTION

A complex problem presented for discussion is that of detecting the presence of an object similar to or identical in composition to an object under investigation. For many years, mankind may have used a divining rod, for example, to envision the presence of water under the ground such as farmland and use the divining rod to determine where to dig a well such that an abundance of water could be tapped as close to the surface as possible. Such a divining rod is disclosed in DE4011344 of Reinhard Schneider filed Apr. 7, 1990 and published Oct. 10, 1991. An antenna is disclosed having slidable glides for tuning the antenna to a frequency of interest. The antenna has handles which may be used by a seeking individual to locate an object sought by the process of "dowsing" with the divining rod. Divining rods involve movement—one rod rotating relative to another, for example. While perhaps not asserted in certain prior art, allowing for rod motion or so-called dowsing may not be required for operation.

A related game is disclosed in U.S. Pat. No. 3,717,950 issued to Venditti Feb. 27, 1973, involving a further divining rod. The divining rod, like that of Schneider, has handles and comprises a rod portion at which distal end is mounted a magnet. The target object is one of a plurality of cards which may mean something to the user which are placed on a board and intuitively selected by magnetic attraction of the divining rod to an allegedly random card of choice.

A well-known detector of metal may be used for sport or for homeland security purposes, for example, to screen passengers at airports. Examples of known metal detectors are described and shown in U.S. Pat. No. 4,334,192 (the '192 patent) and U.S. Pat. No. 7,575,065 assigned to Garrett Electronics of Texas and in U. S. Published Patent Application No.'s 2003/00107377 of Jun. 12, 2003 by Uzman and 2008/0094065 of Apr. 24, 2008 to Candy. An available product for combing beaches, for example, for coins is the Garrett Electronics Model ATX "extreme pulse induction" which utilizes a pulse excitation of a coil at an adjustable 730 pulses per second. By way of example, and as discussed in the '192 patent a search coil, operated, for example, at 5 kHz, is positioned above the earth's surface, ferrous (non-valuable) metal may be rejected by receiving and filtering out a known ferrous signal and a receive coil detects desirable metals such as silver and gold. "A change in magnetic coupling" between the transmit and receive coils indicates a desired metallic object.

International publication WO87/00933 published Feb. 12, 1987, by Iain Saul, suggests that, in addition to a receive coil that a capacitive plate may be provided as a receiver, (a transmit coil is used as with metal detection). Saul indicates that the disclosed detector device may locate wall studs (dielectric material) as well as, for example, copper wiring for use in building remodeling.

In practice, known divining rod devices and metal detectors are limited as to the form of matter capable of detection and location and also as to distance from the device. For example, one model of a Garrett Electronics metal detector operates to a depth of ten feet of sand (and may be operated under water).

Most recently, Katz et al., "Direct MD Simulations of Terahertz Absorption and 2D Spectroscopy Applied to Explosive Crystals," appearing in *The Journal of Physical Chemistry Letters*. 2014, vol. 5, pp. 772-776 proposes the use of light to locate specific threatening materials. Pulses are applied by a terahertz frequency carrier to a substance under investigation and a multi-dimensional spectral response is provided that may be linked, for example, to explosive crystals such as RDX and TAPT.

According to quantum physics theory, a perfect black body absorbs all incident radiation (and so is perfectly black). In actuality, matter exhibits black body radiation when stimulated by any source having, for example, a temperature above 0° K. Black body radiation may be passive or actively collected and is known to provide a signature for the matter (material) under investigation. Collecting such a spectrum and matching it to that of a known sample is possible to identify, for example, a like known sample of matter.

The prior art discloses detectors for use in locating metals and dielectric materials. It remains in the art to develop a device that detects, senses the presence of and locates matter of practically any kind using, for example, a stationary or mobile method of operation.

SUMMARY OF THE INVENTION

The present invention provides a device which can be utilized in one of a stationary and a mobile mode to detect, sense the presence of and locate a like material to that which is deposited in a cone-like portion thereof, for example, comprising a Faraday cage container. In one embodiment, a tube (shaft or barrel) of conducting material, typically comprising copper, is provided and shaped such that an orthogonally constructed L-shaped antenna element extends and freely rotates coaxially within the tube, shaft or barrel and may rotate toward material like that deposited in the bottom inverse cone-shaped portion (Faraday cage) having a non-conductive lid. A further antenna element may be fixed to the surface of the tube portion and permanently point in a given direction. Magnets of like polarity and size and, in alternative embodiments, electric coils may be positioned on each of the antennae. Moreover, in one embodiment, a coil may be positioned coaxially inside the tube, shaft or barrel and around and associated with the rotatable antenna, but electrically isolated from, the orthogonally constructed L-shaped antenna element to detect and monitor flow of electrons on the L-shaped antenna element. Various insulating means may be used to seal the top end of the tube so that the L-shaped antenna element is both electrically separated from the tube or barrel portion and is free to rotate within the tube or barrel. The L-shaped antenna is supported from the bottom, for example, by an open bearing or nonconductive support fixed to the interior surface of the tube or barrel. On the other hand, the second, fixed linear antenna element is electrically isolated from the tube or barrel and extends in the fixed direction and parallel to an extension of the L-shaped antenna element that is moveable.

The present invention is utilized in a stationary mode by placing matter under investigation into the cone-shaped chamber or Faraday cage. Any electromagnetic signal it may radiate bounces around the Faraday cage and is directed toward the L-shaped antenna element. The L-shaped antenna element may move or tend to move in search of like matter, the object of interest in the Faraday cage. The L-shaped antenna element will rotate or tend to rotate toward the like matter if like matter is in the vicinity. A visible read-out of pick-up coil output is displayed on, for example, an oscilloscope 825, 1675 to indicate electromagnetic activity on the L-shaped antenna element. In a mobile mode, the L-shaped antenna element may lead a user of the present invention to the vicinity of the like matter. This and other features of the present invention will be discussed with reference to the drawings and at least a first through fourth embodiment thereof.

In further second, third and fourth embodiments, the L-shaped antenna may be fixed in parallel relation to the second fixed antenna that is attached to the barrel of the device. Electromagnetic signals received by a pickup coil, for example, 830A, 1624 of 28 MAG enamel or other conductive wire wrapped one layer (or more layers) thick around a nonconductive spool approximately three and one half inches in length and positioned coaxially inside and press fitted within the tube, shaft or barrel and having the L-shaped antenna element passing through the centerline and passed to an oscilloscope 825 or 1675 may be used, by the magnitude, frequency, shape or RMS value of the received signal, to indicate the presence of a similar target object or material to that in the Faraday cage and processed to determine direction. Alternatively, a magnetometer may be positioned between the L-shaped antenna element and the fixed antenna element and in the plane defined by the L-shaped antenna element and the fixed antenna element. Monitoring the changes in magnetic flux detected by magnetometer as displayed on the screen of a computer may also be used to indicate the presence of a similar target object or material to that which may be contained in the Faraday cage.

The invention has been demonstrated with reference to an embodiment shown in perspective view in FIG. 16 having a certain object in a Faraday cage of the device and that same object is detected by the embodiment with reference to oscilloscope graphs made when a similar object or material is removed from a separate Faraday cage versus when the object is allowed to remain hidden in the separate Faraday cage (no emission of any electromagnetic fields being detectable). A radio frequency signal, for example, selected between 10 MHz and 20 MHz is transmitted by a single dipole antenna. Resultant oscilloscope graphs differ from 1) when the object is in the separate cage and protected from electromagnetic fields and 2) when the object is released from the separate cage and electromagnetic field waves may be detected by the demonstration embodiment on an oscilloscope. Moreover, it is urged that different objects in the separate cage may be detected and distinguished from one another when removed from the separate cage and its unique graph observed by the user of the device as displayed on the oscilloscope. One utility of the present device and embodiments is for use in detecting the proximity of potentially explosive material such as gunpowder, salt peter or plastic explosives. Each of these may be separately housed in the conical container section at the base of a barrel of the device and an oscilloscope (or magnetometer) may be used to detect the presence in the vicinity of the explosive material, the oscilloscope being connected to at least the coil of the L-shaped antenna.

These and other features of the present detector device will be clarified and shown in the following brief description of the drawings followed by a detailed description of the various embodiments.

BRIEF DESCRIPTION OF THE FIGURES

The features and advantages of the present invention will become more apparent from the detailed description set forth below when taken in conjunction with the drawings in which like reference numbers indicate identical or functionally similar elements.

FIG. 8 shows a side view of the second embodiment of the invention comprising a detector, locator device 800 having an oscilloscope 825 having a display 820 connected via small, insulated holes 812A and 812B through barrel 803 to a pickup coil 830A further described in FIGS. 11 and 12. (Also, please see FIG. 16 and a discussion thereof and a use of wire leads from a pickup coil such as coil 830A to an oscilloscope.)

FIG. 9 is similar to FIG. 2 and shows a typical L-shaped antenna element 801 for insertion in barrel 803 shown in device 800 of FIG. 8.

FIG. 10 is a further embodiment of an antenna element for connection to the barrel 803 that may be fixed by fixing or fastening means 802B and comprises antenna portion 802A which may be directed parallel to a similar portion of L-shaped antenna element 801.

FIG. 11 provides a cut-away view of the interior of non-ferrous conductive barrel 803, typically copper, showing a wound pickup coil 830A connected by wires through the barrel 803 to an oscilloscope 820 of FIG. 8. An electromagnetic field at fixed frequency may be used with this embodiment. The L-shaped antenna element 801 has a pointing portion and a portion resident coaxially within the center of the pickup coil 830A and insulated at top and bottom by insulators 835B1 and 835B2. The L-shaped antenna element may be supported by a simple bearing or non-conductive support piece 803 to the sides of the barrel 803D.

FIG. 12 is very similar to FIG. 11 and provides a cut-away view of barrel 803 so that the coaxially positioned coil 830A is exposed.

FIG. 13 shows details of display 820 of oscilloscope 805 when an object of interest of similar material construction to the object of interest in the Faraday cage 804, 805 is detected and pointed to by antennae elements 801, 802.

FIG. 14 shows details of enhancing an electromagnetic field of antennae 801, 802 by using permanent magnets 810A, 810B of similar size, polarity orientation and strength attached to the antennae elements 801 and 802 respectively.

FIG. 15 shows a typical portable mode use of device 800 for detecting, locating an object of interest.

FIG. 16 shows a perspective view of a demonstration embodiment 1600 of an object detector, sensor and locator comprising a moveable antenna 1610, a cap portion 1605 to a barrel portion 1625, a stationary antenna portion 1630 comprising a holder 1633, a detector coil section 1632 with leads to an oscilloscope 1675, and a container cone section 1640 located at the bottom of the barrel section 1625 for receiving a certain object to be detected. Also shown, is a signal generator 1650 and dipole antenna 1645 for generating an electromagnetic field signal of particular selected frequency and transmitting the signal via an antenna 1645 for reception by coils of the embodiment and by the material of interest.

FIG. 17 shows the cap portion 1605 having insulation and turn section (unnumbered) for permitting the moving antenna portion 1610 to move and point in any direction without passing electromagnetic signals to the barrel 1625.

FIG. 18 shows the barrel portion 1625 which is connected to the container cone section 1640 which may receive via coil 1624 of antenna 1610 any electromagnetic signals generated by leaked to antenna 1645 or emitted by a certain object in the container cone section at one end and any signals received by moveable antenna section 1610 at the other pointing both toward the object in the cone section 1640 and toward the same certain object when released from a separate Faraday cage (not shown).

FIG. 19 shows the moveable antenna section 1610 in some detail with coil 1624 and leads 1620-1 and 1620-2 to be graphically shown on oscilloscope 1675.

FIG. 20 shows details of fixed antenna arm 1630 showing coil portion 1635 moved from its normal position inside coil protector 1632 to the right, an arrow shows the direction of replacing coil portion to the inside of coil protector 1632.

FIG. 21 shows the output of an oscilloscope 1675 as displayed from inputs from coils 1624 and 1632 when a certain object identical to an object contained in the container cone section 1640 is not in the vicinity of the apparatus of FIG. 16 but may be contained in a separate Faraday cage. One output 2110 represents the single frequency generated by signal generator 1650 (no pick-up of any signal emitted by an object of interest) and the center graph shows a waveform generated by the object of interest when released from a separate Faraday cage.

Now the detector, locator devices 100, 800, 1600 for detecting/locating an object of interest will be further described in the following detailed description of the preferred embodiments.

DETAILED DESCRIPTION

The present invention is described with reference to FIGS. 1 through 7 of a first embodiment and FIGS. 8-15 of a second embodiment and FIGS. 16-21 of a third embodiment of a detector/locator device for detecting and locating an object of interest. A third embodiment having fixed antennae elements will also be discussed with reference to FIGS. 1-21 and this demonstrated embodiment discussed with reference to FIGS. 16-21. In particular, the present invention is directed to devices, systems, methods and computer program products for facilitating the detection, sensing the presence of, storing representative electromagnetic field signals detected thereby and locating and exposing of objects of interest placed within a conical shaped section of the detector/locator device functioning as a Faraday cage and comprising at least one L-shaped antenna element to allow for the collection of electromagnetic spectra from the object of interest and a like object of interest (not hidden in a Faraday cage) and comparison of such spectra to objects located within a geographic area surrounding the location of the device whereby such objects in such geographic area may be located.

Although the figures depict prototypes of the invention designed for use with exemplary objects of interest, the invention is not limited to these embodiments. The present invention also encompasses models designed for use in potentially detecting and locating other objects of interest but has yet not been tried for locating all potential objects of interest. For example, the object of interest may be explosive material (demonstrated), a diamond or other object having a particular crystalline structure, a plastic explosive, paper money, coins of silver or gold, materials comprising DNA such as bone, genetically linked flora and piezoelectric materials.

Figure 1:
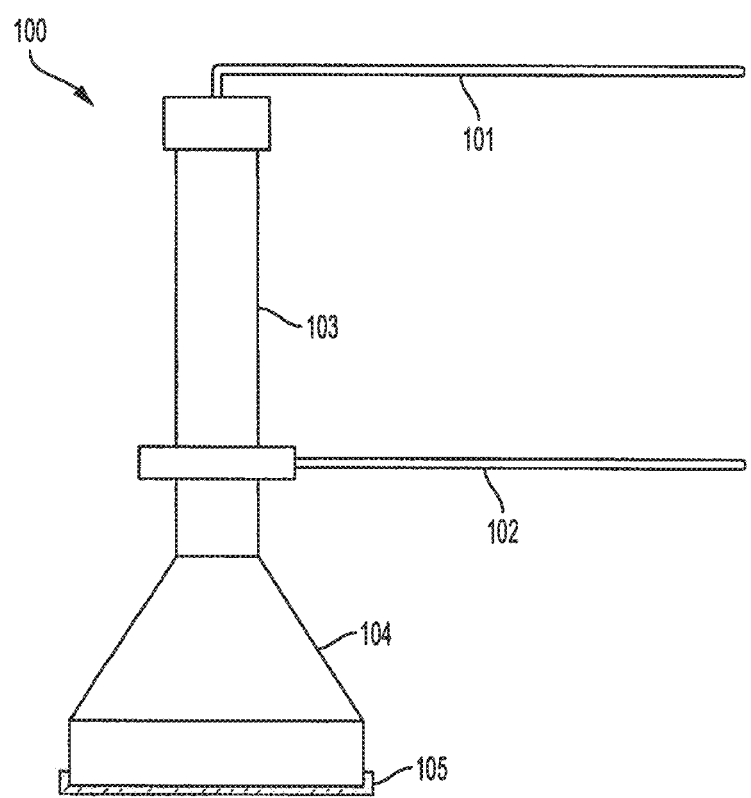
FIG. 1 is a mechanical diagram showing the structure of a first embodiment of a device 100 for detection of matter of like kind to that which may be contained in container 104 of device 100. Like reference numerals, once introduced, such as reference numeral 104 refer to the same or similar component wherein the first numeral 1XX represents the Figure number where the component first appears.

FIG. 1 depicts a first embodiment of a detector/locator device of the present invention 100. As shown in FIG. 1, the device 100 is made up of at least four (4) groups or assemblages of components: an upper or rotating conductor/rod/antenna 101 which is preferably L-shaped; a lower, stationary conductor/rod/antenna 102; a tube, shaft or barrel portion 103, and a container portion functioning as a Faraday cage 104 having an optional cover or lid 105.

Figure 2:
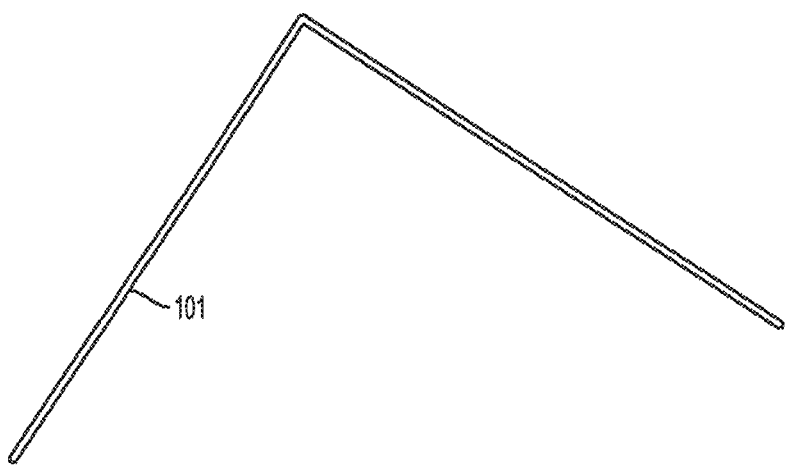
FIG. 2 is a mechanical diagram showing an example of an orthogonal antenna element 101 positioned within device 100 as shown in FIG. 1, the antenna preferably constructed of electrically conductive material such as copper, aluminum, or iron, antenna 101, in one embodiment having rounded tips as shown at each end.

In FIG. 1, the upper or rotating conductor/rod/antenna 101 may not be fully appreciated and reference is made to FIG. 2. Referring to FIG. 2, L-shaped antenna element 101 consists of a section of heavy gauge wire or rod that may contain both ferrous material and electrically conductive material such as iron, aluminum and copper in various proportions (for example, from three to twenty inches in length per section and from fine gauge to very thick gauge wire, for example, from 18 gauge to 12 gauge. Thus, the rod or wire of antenna element 101 is capable of allowing flow of electrons that may result from changes in electrical and magnetic fields. L-shaped antenna element 101 is fabricated to form a 90-degree angle creating horizontal and vertical sections, the horizontal portion for pointing and the vertical section being mounted coaxially, contained and electrically insulated within barrel 103, which comprise L-shaped antenna 101 for picking up any signal generated by an object of interest in a container 104. The vertical section of L-shaped antenna element 101 may thus be suspended inside the shaft or barrel 103 of the device 100. The horizontal section of L-shaped antenna element 101 may protrude horizontally outward from the top of the shaft or barrel 103 of the device 100 and rotate or be fixed in relation to antenna 102. The horizontal section of L-shaped antenna element 101 may be free to rotate in a horizontal plane in response to electromagnetic dynamic and static field forces, those stimuli being either generated or naturally occurring and simply encountered within a geographic area of device 100. Both end surfaces of L-shaped antenna 101 may be rounded (have rounded tips) to both reduce frictional resistance to rotation and to eliminate sharp points that may tend to modify surface charge density.

Figure 3:
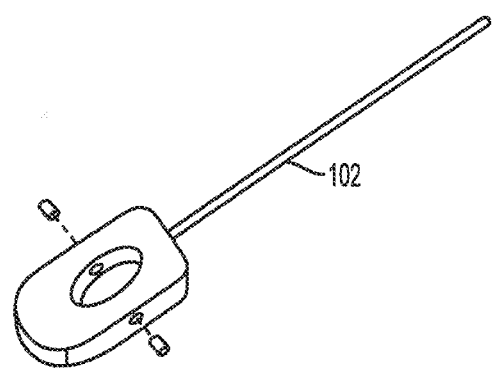
FIG. 3 is a mechanical diagram of a fixed antenna element 102 positioned on the tube part 103 of the device 100 extending approximately the same length from tube part 103 as the L-shaped antenna 101 as seen in FIG. 1 and electrically isolated from the tube 103 but attached to the tube, for example, by screws or equivalent fasteners and electrically non-conductive material shown.

A lower, stationary conductor/rod/antenna element 102 may not be fully appreciated with reference to FIG. 1 and reference is made to FIG. 3. Lower antenna element 102 consists of a section of wire or rod having the same gauge, chemical makeup, electrical conductivity, and magnetic (or electrical) field properties as that used in fabrication of L-shaped antenna element 101. Lower antenna element 102 extends horizontally from a point proximate to the shaft or barrel 103 and is positioned directly below and parallel to the plane in which the horizontal section of L-shaped antenna 101 may be fixed or free to rotate. Both L-shaped antenna 101 and lower, stationary antenna 102 extend horizontally equidistantly as measured from the centerline of the tube, shaft or barrel portion 103 (see FIG. 1) of first embodiment 100. The end of fixed, lower antenna 102 closest to the shaft or barrel 103 may be pressed into a hole drilled into a structural element fabricated from a material with good electrical insulation properties in one embodiment. That structural element may slide over and fit around and be affixed to barrel 103 by setscrews, by use of an adhesive, or by simply press fitting or other fixing means known in the art. The end of lower antenna 12 farthest from barrel 103 may be preferably rounded, for example, to minimize the effects of surface charge density variations.

Figure 4A:
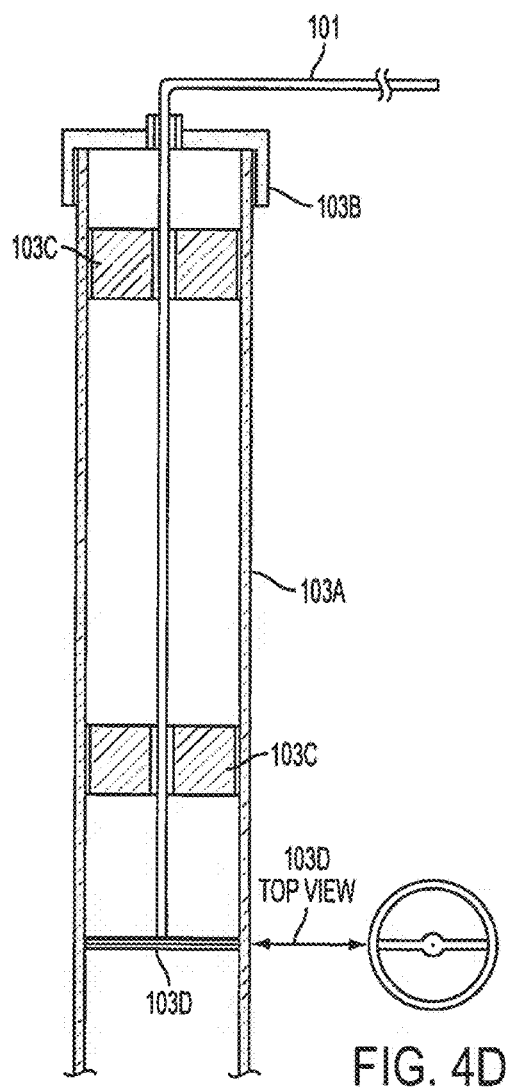
FIG. 4A shows a section 103A of the tube 103 of FIG. 1. An insulating collar 103B allows L-shaped antenna element 101 to freely rotate as it is supported by support 103D shown in top view in FIG. 4D.
Figure 4B:
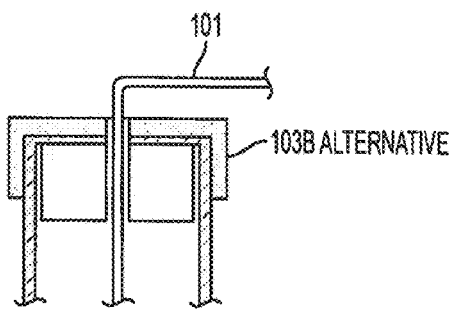
FIG. 4B shows an alternative construction of the insulating collar 103B bottom to top view of the first medium sized embodiment of the invention.

The tube, shaft or barrel portion 103 may not be seen as well in FIG. 1 as in FIG. 4A. Barrel section 103 of device 100 consists of a section of non-ferrous pipe or tube 103A, typically comprised of copper or other conductive material. In operation, the orientation of this tube, shaft or barrel 103 is approximately vertical having a container 104 having a lid 105 forming a Faraday cage at the bottom (for receipt of a sample object of interest). The top end of the shaft or barrel 103 may be enclosed with a cap 103B fabricated from a polymeric material with good electrical insulation properties to isolate the barrel 103 from the L-shaped antenna 101. The uppermost surface of the cap may be drilled to accommodate insertion of the L-shaped antenna 101 vertical portion: permitting the upper or rotating horizontal conductor/rod/antenna portion of antenna 101 to rotate (in this embodiment). Alternatively, as seen in FIG. 4B, the hole drilled in cap 103B can be outfitted with a sleeve of nylon, Teflon, or other material with good electrical insulation properties to create a topmost bearing to position and support L-shaped antenna 101, the upper or rotating conductor/rod/antenna portion while minimizing the frictional resistance to rotation of L-shaped antenna 101.

Figure 4C:
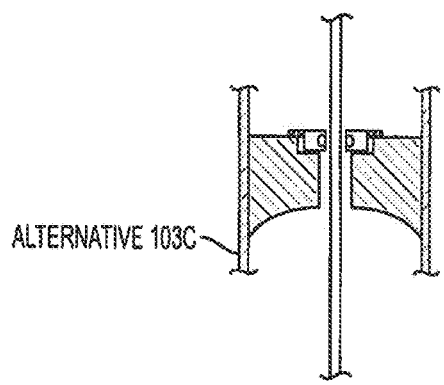
FIG. 4C shows an alternative construction of the L-shaped antenna element support 103C bottom to top view of the second medium sized embodiment of the invention.

The tube, barrel or shaft 103 is typically outfitted with two bearing units 103C positioned inside the pipe or tube as shown in FIG. 4A. The body of the bearing units 103C is fabricated from a material such as nylon, Teflon, or PVC that has good electrical insulation properties. This unit 103C may be prepared in at least two configurations. In the first, a hole of appropriate size is drilled to support and align L-shaped antenna 101 coaxially precisely in the center of the barrel or shaft 103. Drilled appropriately, this hole also enables the support units 103C to act as a sleeve-type bearing to minimize resistance to rotation of L-shaped antenna 101 portion: the upper rotating (or fixed), approximately horizontal conductor or wire portion of 101. In the second configuration as seen in FIG. 4C, an oversized hole is drilled along the centerline of the alternative bearing body 103C. A countersink at the top of body 103C may accommodate the flange of a roller bearing unit so that the L-shaped antenna 101 rotates more freely. Thus, the upper or rotating L-shaped conductor/rod/antenna 101 can be supported and aligned coaxially along the vertical centerline of the shaft or barrel 103 by using precision roller bearings that also provide minimal resistance to rotation.

To fix the vertical position of the upper or rotating L-shaped conductor/rod/antenna 101 within the shaft or barrel 103, two configurations have been implemented. In the instance wherein roller bearing units are used, the vertical portion of the vertical shaft portion of L-shaped antenna 101 is simply press-fit into the two roller bearing units 103C at specified positions along the vertical shaft portion of antenna 101. When these flanged roller bearing units affixed to L-shaped antenna 101 are then placed in the respective bearing bodies 103C within the barrel or shaft 103, the position of L-shaped antenna 101 relative to the barrel or shaft 103 is assured. When the bearing bodies 103C are configured to act as sleeve bearings for aligning and positioning L-shaped antenna 101, the rounded lower end of the vertical portion of antenna element 101 rests on a platform 103D installed near the lower end of barrel 103 and seen in top view, by way of example in FIG. 4D. This platform 103D may consist of a narrow strip of a hard-surfaced material having good electrical insulation properties such as PVC that spans the diameter of barrel 103 and may be affixed to the sidewalls of barrel 103 with an adhesive or other bonding material known in the art. The hard surface of the platform or support 103D combined with the rounded lower end of the vertical portion of L-shaped antenna 101 leaves antenna 101 free to rotate with low frictional resistance and to point to the object of interest in the cage 104. Further, the platform or support 103D provides direct open-air access to that segment of the vertical portion of L-shaped antenna 101 that extends below the lower bearing body 103C for collection of any emitted electromagnetic field from the object of interest in Faraday cage 104, 105.

Referring to the Faraday cage 104, 105 of FIG. 1, cage 104, 105 is intended to contain an object of interest and preclude entry into the Faraday cage by any extraneous electromagnetic fields. Faraday cage/container 104, 105 is fabricated for example, from molded copper, copper plate, copper sheet, copper mesh, or copper fabric into a shape so as to function as a Faraday cage capable of isolating a specimen or sample from electric fields, both those naturally occurring and those that may be induced outside the cage 104, 105. The Faraday cage 104, 105 attaches electromagnetically to the open bottom of the shaft or barrel 103. This Faraday cage 104 is fabricated in a range of lengths and diameters, for example, as a cone with the smallest diameter being that of the shaft or barrel 103. The bottom of the Faraday cage 105 is either left open or is enclosed with a fitted lid 105 and may be crafted of a lightweight polymeric material. The top of the Faraday cage 104 is open to the shaft or barrel 103 and the upper or rotating conductor/rod/antenna 101 located inside barrel 103. An object of interest may be suspended in the cage 104 or be affixed to the sides. It is theorized that electromagnetic radiation emitted by an object under investigation may be collected by antenna 101 having electromagnetic waves that have been carried by or reflected from interior walls of the Faraday cage to the antenna element 101.

Operation of the Device as Described

A. In-Motion (Portable) Operation in the Hands of an Operator.

Operation while walking with the device 100 to detect, sense the presence of and to locate a target Item, object, or substance of interest will now be described, for example, with reference to FIG. 5. A sample of an item, substance, or material being sought, or a sample containing a significant component of the makeup of the item, sample, or material being sought is placed in the Faraday cage 104 as an object of interest reference for the device 100. That sample is retained in the Faraday cage 104 during device 100 operation by placing the lid 105 onto the open bottom side of the Faraday cage 104, with the object of interest contained within the Faraday cage 104. Similarly, the sample may be suspended inside the Faraday cage 104 with adhesive tape or other similar means of fastening common in the art, thus eliminating the necessity of using the lid 105. The item (not shown) must extend far enough up into the Faraday cage 104 so as to be surrounded on all sides by the cage 104 and the cage reflect or carry any emission of electromagnetic radiation therefrom without external noise leaking into the cage 104 or sample.

Figure 5:
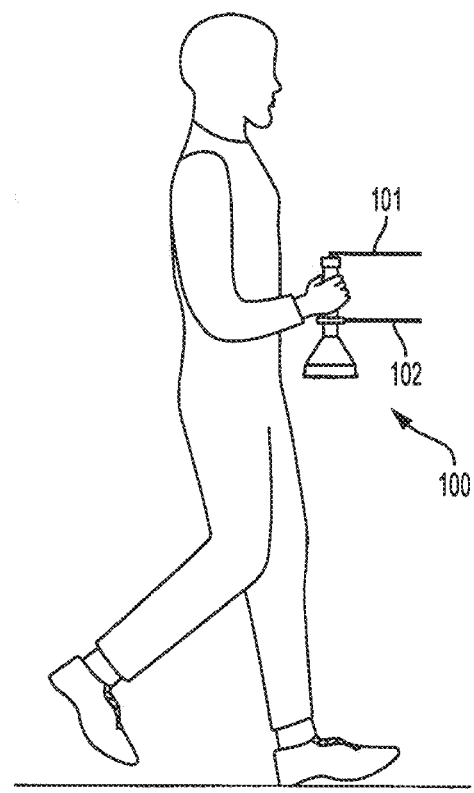
FIG. 5 shows a user of the invention 100 in a portable mode of operation in search of an object of interest as may be directed by the L-shaped antenna element 101.

The device 100 may be supported in the palm of the hand of a user with the fingers wrapped around the shaft or barrel 103 as indicated in FIG. 5. The shaft or barrel 103 of the device 100 may be held near the torso of the body with barrel 103 oriented in a near vertical position and with the lower, stationary conductor/rod/antenna 102 pointing directly ahead along the proposed path of travel of the user.

The operator thus holding the device 100 then may walk at a normal pace, being careful to keep the device 100 properly oriented as per FIG. 5 during travel. As the operator nears the target item, sample, or material, likewise found in the Faraday cage 104, the horizontal portion of the L-shaped upper or rotating conductor/rod/antenna 101 may indicate detection, sensing the presence of and location of an object of interest by rotating, as viewed from above, either clockwise (to the right) if the target is situated to the right of the path of traverse of the operator or counter-clockwise (to the left) if the target is situated to the left of the path of traverse of the operator. Alternative, in further embodiments, a signature electromagnetic field may be detected and assist in pointing to an object of interest in the environment of the search. Based upon the movements of the upper, horizontal or rotating conductor/rod/antenna 101 or recorded measurements and results of their analysis, the operator can adjust the path of travel as necessary to zero-in on the target item, sample, or material. As the operator moves over and passes the target item, sample, or material in a geographic area of the device 101, the upper or rotating conductor/rod/antenna 101 may swing around toward the operator; that is, the upper or rotating conductor/rod/antenna 101 may rotate 180 degrees from its normal "straight ahead" position when passing the location of the object of interest (similar to the object in the cage 101).

Three Operational Modes

Normal Searching Mode.

This mode is used when the location of the object being sought is absolutely unknown. Referring to FIG. 5, a sample of the target object(s) is placed in the Faraday cage 104 and covered by cover 105. The operator may hold the device 100 in either hand as described above with the lower, stationary conductor/rod/antenna 102 pointing away from the operator's body and in the direction of travel; (see FIG. 5). Comfort in operation dictates that the device be held to the left or right of the operator's midline for left-hand and right-hand operation, respectively. The forearm should be approximately parallel to the ground, meaning the device should be situated in front of the operator torso, for example, at about stomach level. The device is tilted slightly forward away from vertical so that gravity compels the upper or rotating conductor/rod/antenna portion of L-shaped antenna 101 to align with fixed lower antenna 102 which may be pointed directly away from the operator's body. The horizontal upper or rotating portion of L-shaped conductor/rod/antenna 101 will naturally sway back and forth slightly as the operator walks. As a potential target is approached, the upper or rotating conductor/rod/antenna portion of L-shaped antenna 101 will lock on, begin rotating toward the target, and thus track the target or magnetometer or oscilloscope displays may be analyzed to detect the presence of the object of interest and its direction. The operator should continue walking in the antenna chosen direction of travel until the rod rotates 90 degrees from its original position directly in line with the path of travel. Note that the target object thus detected could, at this point, be several hundred yards away from the searcher, depending upon conditions. The upper or rotating conductor/rod/antenna 101 now having rotated, for example, 90 degrees, the operator should change directions and walk toward the indicated target area. Finding the specific location of the target could be aided by triangulation or tri-lateration, that is, pinpointing the target location by approaching it from several directions. When the target area has been identified, the operator should walk directly toward the target (and look for an increase in electromagnetic field strength of a displayed waveform. As the operator walks over and past the target area, the upper or rotating conductor/rod/antenna 101 will tend to rotate 180 degrees, thus pointing toward the operator's body. The operator should stop walking forward at this point and move backwards until the upper or rotating conductor/rod/antenna 101 rotates back to facing directly away from the operator. The area between these two points becomes the target area for target object search.

Although not producing results of the same level of accuracy, tests have shown that the operator does not have to be walking with the device 100 to locate targets if the target or targets are situated nearby. After the target sample has been placed in the Faraday cage chamber 104, 105 for a period of several seconds, the device 100 should be held in normal searching mode, that is, in front of the body with fixed antenna 102 pointing directly forward and away from the body of the operator. L-shaped antenna 101 will lock on and point in the general direction of the target, providing a general idea of location. As much as 30 seconds may be required for the motion of L-shaped antenna 101 to stabilize. Antenna 101 swinging back and forth indicates that the device 101 is searching, but that the target is not located. If antenna 101 begins rotating, the target (for example, an area of gold such as a gold vein) is indicated as being situated at multiple locations around the operator. Similarly, a signature electromagnetic field waveform may differ in intensity as an object is approached or moved away from.

Searching to the Right Side of the Forward Walking Operator

The device is held as discussed above per FIG. 5 except the device 100 is now oriented so that fixed antenna 102 may point 90 degrees to the right of the operator path of travel. In this mode, only the area to the right of the operator path of travel will be searched; any potential targets on the left will be disregarded. This search mode is appropriate where multiple instances of targets substance may be scattered about, or if one wants to limit the search to a specific arc. If multiple targets exist to the right of the operator, the device 100 will behave preferentially and tend to lock on the strongest electromagnetic signal. If there are multiple targets to be located to the right side of the operator, the procedure will be repeated keeping in mind the location(s) of targets already located.

Searching to the Left Side of the Forward Walking Operator

The same procedure as described in above may be followed except that the device 100 is held so that fixed antenna 102 points 90 degree to the left of path of operator path of travel.

Handheld Operation from a Transporter to Locate Target Item, Object, or Substance Use in a vehicle, for example, will now be described. A sample of the item, substance, or material being sought, or a sample containing a significant component of the makeup of the item, sample, or material being sought is placed in the Faraday cage 104 as reference for the device 100. That sample is retained in the Faraday cage 104 by cover 105 during device operation by placing the lid 105 onto the open bottom side of the Faraday cage 104 with the object under investigation in the cage/container 104, 105.

The device 100 may be supported in the palm of the hand with the fingers wrapped around the shaft or barrel 103 as indicated in FIG. 5 (but with the operator in a transporter). The shaft or barrel 103 of the device 100 is held near the torso of the body with barrel 103 oriented in a near vertical position and with the lower, stationary conductor/rod/antenna 102 pointing directly ahead along the proposed path of travel of the transporter.

The operator may be standing or seated as is appropriate for the transporter. In either instance, the device is to be maintained in close proximity to, but not touching, the torso of the operator. The transporter carrying the operator then proceeds to translate along the chosen path.

As the transporter moves along, the operator must be diligent to keep the device 100 properly oriented and up right. As the transporter carrying the operator nears the target item, sample, or material, the upper or rotating conductor/rod/antenna 101 will indicate detection by rotating either clockwise (to the right) if the target is situated to the right of the path of traverse of the operator or counter-clockwise (to the left) if the target is situated to the left of the path of traverse of the operator. Based upon the movements of L-shaped rotating antenna 101, the upper or rotating conductor/rod/antenna, the travel path of the transporter is then adjusted as necessary to zero-in on the target item, sample, or material.

Stationary (Fixed) Operation with No Hands-on Operator

Figure 6:
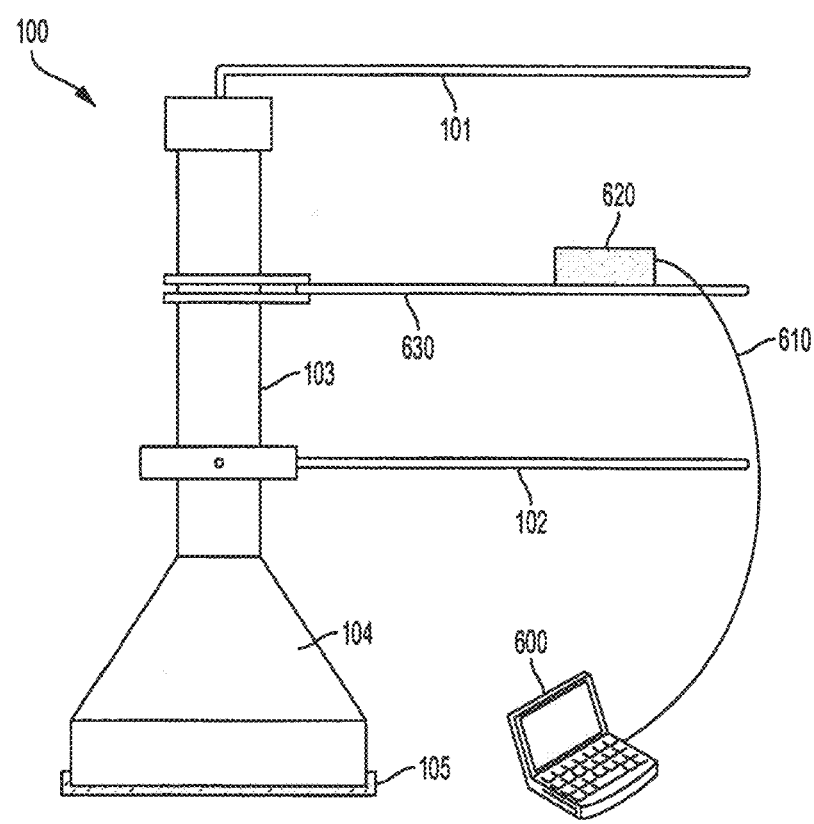
FIG. 6 shows a detailed side view of the first embodiment of the invention of FIG. 1 in a stationary mode showing a magnetometer affixed to a non-conducting support structure, in turn, attached to barrel 103, the magnetometer monitoring the changes in magnetic flux in the region between the L-shaped antenna element and the fixed antenna element and having a wire/cable connection to a personal computer 600 for obtaining a read-out or display change in electromagnetic field strength.

Operation as a stationary device for detecting, approaching, passing, or proximate moving a target item, substance, or material similar to that contained in cage 104 will now be discussed. The device is affixed in a rigid holder 104, 105 (for example, by mounting on a platform) as indicated in FIG. 6 with the shaft or barrel 103 oriented vertically and the open end of the Faraday cage 104 and lid 105 downward. A three-axis magnetometer 620 may be positioned midway along the vertical distance between the upper or rotating conductor/rod/antenna 101 and the lower, stationary conductor/rod/antenna 102. The horizontal position of the magnetometer 620 may be positioned midway between the centerline of the shaft or barrel 103 and the free ends of the antenna 102. The magnetometer 620 is connected via a wiring harness to a programmable controller board, which in turn is connected to a laptop computer. The laptop computer 600 and controller board may serve both to power the magnetometer system and to record and display magnetometer measurements for the three axes, these measurements collected and displayed, for example, at one-second intervals on a display of computer 600 (the waveform being indicative of direction and proximity by signal magnitude. The data for the three axes (x, y and z) are converted to a single value by finding the magnitude of the vector sum of the three components. This approach provides a digital output stream allowing easy visual identification of when the vector sum changes substantially, thus indicating detection, presence, direction of a similar object of interest.

A sample of the item, substance, or material being sought, or a sample containing a significant component of the makeup of the item, sample, or material being sought is placed in the Faraday cage 104 (container 104, 105) as reference for the device 100. That sample is retained in the Faraday cage 104 during device operation by placing the lid 105 onto the open bottom side of the Faraday cage 104. A moving target item, substance, or material that approaches, passes, moves proximate to the device will now be detected by L-shaped antenna 101 with device 100 being stationary.

Operation as a stationary device 100 in a moving transporter for detecting or locating either a stationary or moving target item, substance, or material will now be discussed. As described above, a stationary installation of the device 100 can be made in a transporter (or vehicle). The transporter then can carry the sensing device 100 along paths or to areas of interest in searching for items, objects, substances, and materials of interest (contained in cage 104). If a device operator is aboard the transporter carrying the installed, upright device 100 carrying an object under investigation, data monitoring is generally the same as described above for stationary operation. If the operator cannot be onboard the transporter, as with an unmanned aerial vehicle (drone), data monitoring and assessment can be performed remotely.

Results, Findings, and Observations:

Various assertions about the first embodiment of the invention, device 1 are now made.

Assertion 1.

The device 100 may detect, sense the presence of, and locate items, objects, or packages comprised of or containing a specified material of substance characterized as having a crystalline lattice structure, including, but not limited to those that are piezoelectric.

Assertion 2.

When a given formulation of a material is a mixture made up of two or more materials, the device can be used to detect, sense the presence of, and locate a component of that material, for example, provided that a component of the mixture is characterized as having a crystalline lattice structure. For example, propellants used in modern ammunition vary widely. However, a common component of most ammunition propellant is potassium nitrate ($KNO_3$). Thus, potassium nitrate may be used as the sample contained in cage 104 in searching for or seeking to detect, for example, ammunition propellant.

Assertion 3.

Each material characterized as having a crystalline lattice structure emits, gives off, and produces a unique electromagnetic signature under principles of quantum theory. That means that the reference sample in the Faraday cage 104, 105 of the device 100 and the material being sought produce identical or near-identical electromagnetic field signatures.

Assertion 4:

The device 100 can detect, sense the presence of, and locate piezoelectric materials without having a sample of subject material in the Faraday cage 104. For example, bone is piezoelectric; thus, the device may react to the presence of bone with the Faraday cage 104 empty and open.

Assertion 5.

When the device is carried or held by an operator during hand-held operation, the body of the operator, when in close proximity the device 100, may enhance electromagnetic field stimulation of the object or item in the Faraday cage 104, thus stimulating the production of that material's unique signature.

Use of Fixed Magnetic Field During Device Operation

Figure 7:
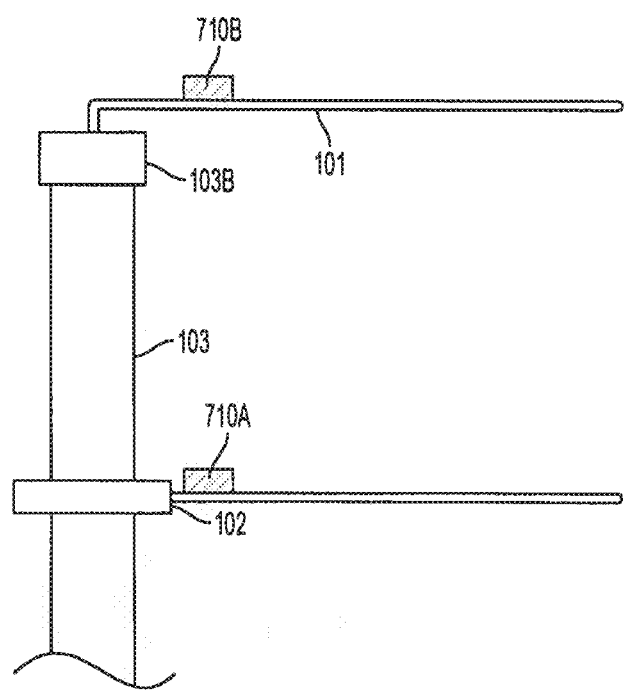
FIG. 7 shows a detailed side view of the first embodiment having first and second permanent magnets applied of like polarity orientation and size to L-shaped antenna element 101 and to fixed antenna 102 for use in a further stationary mode.

While the use of magnets or coils may not be required to make the device 100 functional, detection capabilities of the device can be enhanced when a small rare earth magnet, for example, magnet 620 is positioned on both the upper or rotating conductor/rod/antenna 101 and the lower, stationary conductor/rod/antenna 102 as magnets 710A and 710B as shown in FIG. 7. Tests revealed that best performance was achieved when the two magnets 710A, 710B were aligned with each other, sized similarly, vertically located and positioned near the ends of both the L-shaped antenna element and the fixed antenna element distal to the centerline of the shaft or barrel 103. When using magnets 710A and 710B, those magnets should be oriented so that the magnetic field enhanced by their presence extends outward from antennae 101 and 102 in the same manner. For example, if the north pole of the magnet on the L-shaped antenna element is facing upward, the same should be true of the magnet placed on the fixed antenna element below.

Also, it is important to note that if magnets 710A and 710B are used as described above, the upper or rotating conductor/rod/antenna 101 can be fabricated from a non-ferrous material, such as aluminum. In fact, if L-shaped antenna 101 is fabricated from non-ferrous material, magnets 710A and 710B employed as indicated above may be required for the device 100 to function properly.

Examples of Objects, Substances, and Materials Actually Detected or Located in Tests of the Device The following are examples of objects under investigation that have been successfully detected, sensed and located by device 100 operated as described above: human and animal bone; human DNA; genetically linked flora; gun powder, propellants, and explosives; pharmaceuticals and narcotics (e.g., methamphetamine, OxyContin, Xanax); U. S. currency and other special paper and coins; precious, semi-precious, and rare earth metals; precious and semi-precious jewels; and piezoelectric materials.

Figure 8:
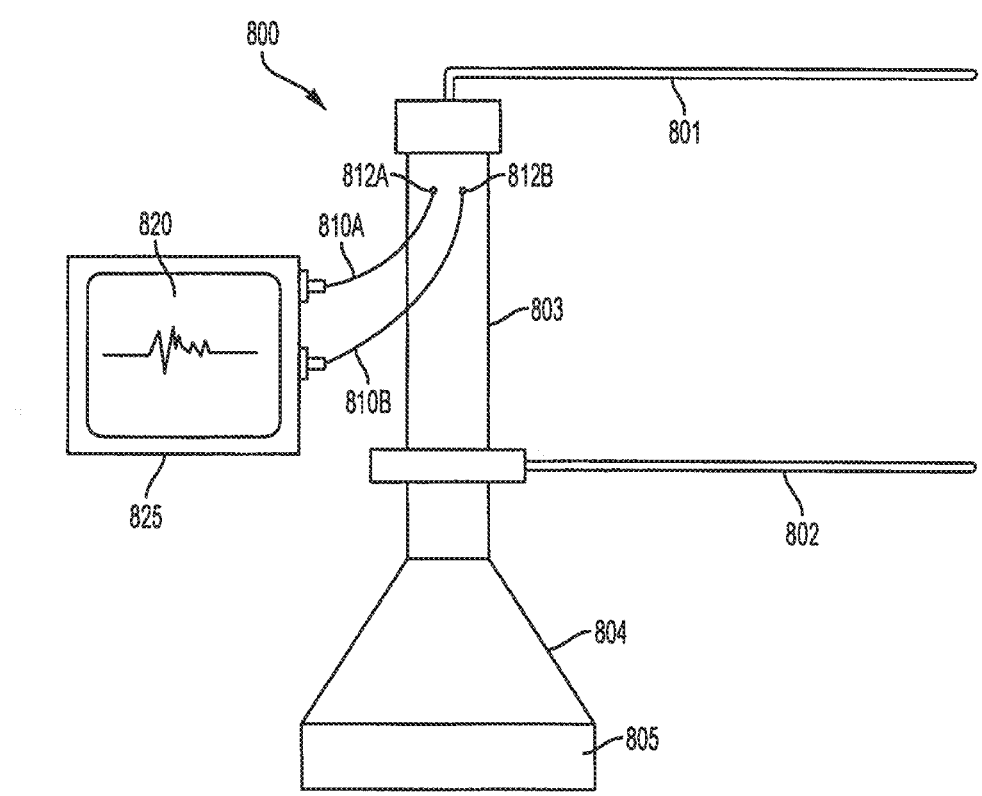
FIGS. 8-15 show details of a second embodiment 800 of the present invention having a similar exterior appearance to the first embodiment but additionally having small insularly protected holes 812A, 812B in the barrel 803 for receiving electrical connectors 810A and 810B for connection to an oscilloscope 805 having a display 820.

A second embodiment of the present invention will now be described with reference to FIGS. 8-15. As shown in FIG. 8, a second embodiment of the present invention, detector/locator device 800, may comprise up to five or more groups or assemblages of components: an L-shaped upper or rotating conductor/rod/antenna element 801; a lower, stationary conductor/rod/antenna element 802; a tube, shaft or barrel 803; a Faraday sample container cage 804 and lid 805; and a signal processing and display unit, for example, an oscilloscope 825. There may be an optional external stimulating electromagnetic field comprising, for example, a source of very low frequency current of less than one Hz to 60 Hz, preferably 7 Hz to 8 Hz (near a Schumann resonance frequency) or a high frequency electromagnetic field of fixed frequency. This external source (not shown) may comprise an external loop coil located coaxially with the device (or a simple dipole antenna or other signal generator/antenna). In one embodiment, the external loop may be pulsed near a Schumann resonance frequency at about 7 or 8 pulses per second. The external loop coil may also be located elsewhere proximate to the device. Also, as will be discussed herein, a magnetic field source or sources such as a permanent magnet or source of magnetic field may be provided.

Figure 9:
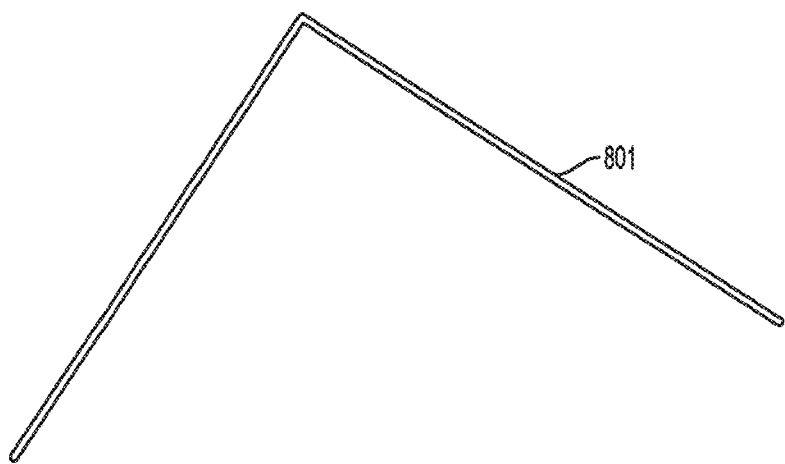

A detector, sensor and locator device 800 may comprise an L-shaped upper or rotating conductor/rod/antenna element 801 which will now be discussed with reference to FIG. 8 and FIG. 9. L-shaped antenna 801 may consist of a section of a heavy gauge wire or rod that contains ferrous material and is conductive of electricity and magnetism, for example, and be of three inches to twenty inches in length per horizontal and vertical sections and 18 gauge to 12 gauge; thus, the wire antenna 801 is capable of allowing the flow of electrons in response to changes in the electromagnetic flux. L-shaped antenna element 801 is fabricated in the form of a 90-degree angle creating horizontal and vertical sections. The vertical section of antenna 801, mostly contained with barrel 803, and thus electrically shielded, extends along the centerline of the shaft or barrel 803 of the device 800. The horizontal section of antenna element 801 extends horizontally outward from the top of the shaft or barrel 803 of the device 800. The horizontal section of antenna 801 is free to rotate in a horizontal plane in response to either or both electromagnetic or dynamic or static forces, those stimuli being either generated or naturally occurring and simply encountered. Both end surfaces of L-shaped antenna element 801 may be rounded to both reduce frictional resistance to rotation and to eliminate sharp points that may tend to modify the surface charge density.

The upper horizontal section of rotating L-shaped conductor/rod/antenna 101 can be replaced with a multi-element unit similar in construct to a Yagi directional antenna with multiple dipole antennae elements of different length, thus allowing the creation of a charged focal pattern for more direct detection or sensing. This approach is enhanced if the multi-element antenna unit is tuned to a specific dynamic electromagnetic signal associated with the item or materials that one is seeking to detect, but such tuning is not particularly necessary.

Figure 10:
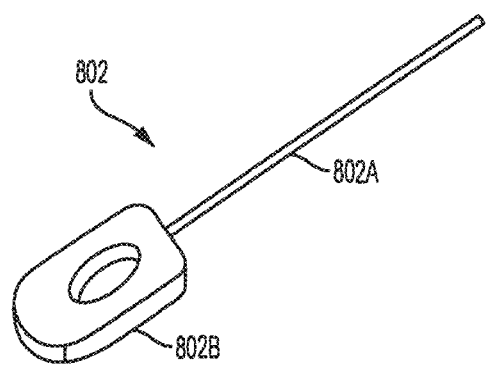

The lower, stationary conductor/rod/antenna 802 is shown in FIG. 8 and FIG. 10. Lower antenna element 802 consists of a section of rod or wire 802A having the same gauge, chemical makeup, electrical conductivity, and magnetic properties as that used in L-shaped antenna 801. Antenna 802 extends horizontally from a point proximate to the shaft or barrel 803 and is positioned directly below and parallel to the plane in which the horizontal section of L-shaped antenna 101 is free to rotate. Both antennae elements 801 and 802 extend horizontally equidistantly as measured from the centerline of the shaft or barrel 803. The end of antenna 802 closest to the shaft or barrel 803 may be pressed into a hole drilled into a structural element 802B fabricated from a material with good electrical insulation properties or low dielectric. That structural element 802B slides over and fits around and is affixed to barrel 803, for example, by setscrews, by use of an adhesive, or by simply press fitting or using other fixing means. The end of antenna 802 farthest from barrel 803 is rounded to minimize the effects of surface charge density variations.

Figure 11:
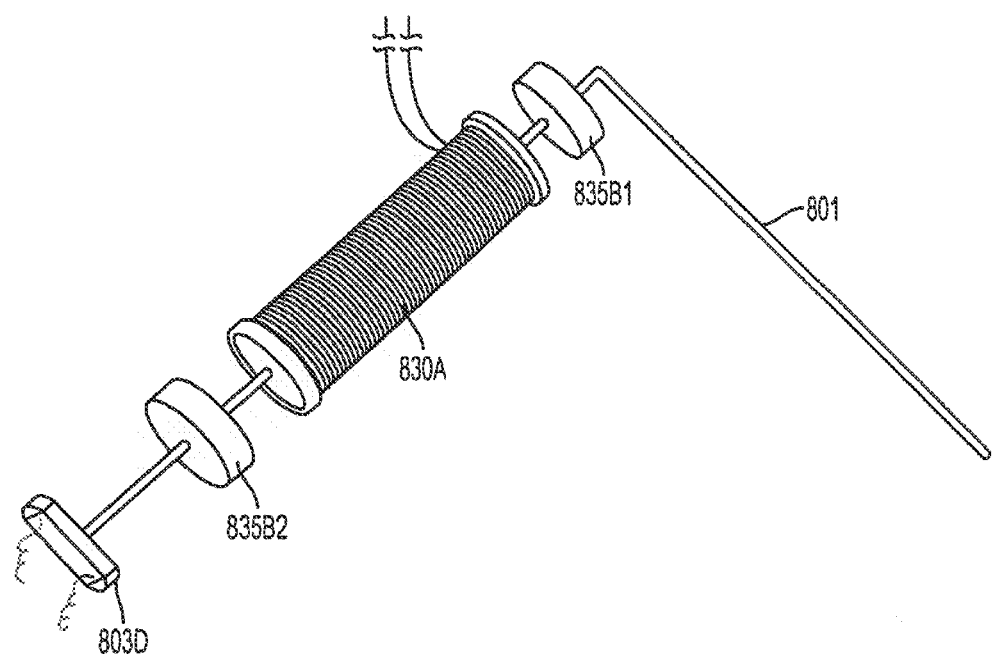
Figure 12:
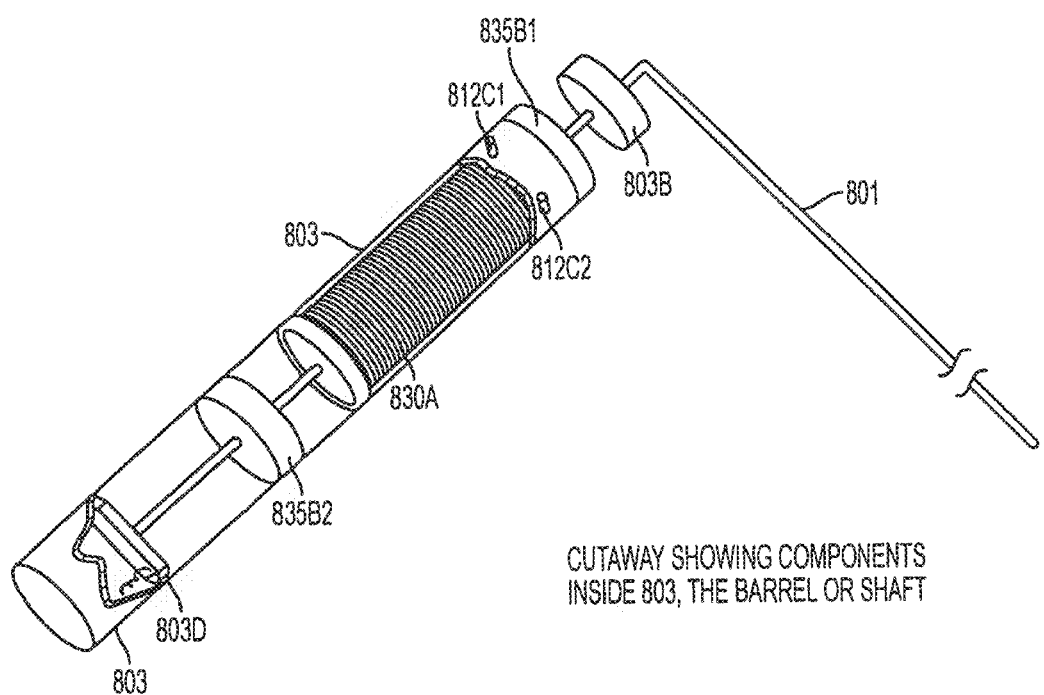

The shaft or barrel interior is seen in FIG. 11 and shown in cut-away in FIG. 12. Barrel 803 consists of a section of non-ferrous pipe or tube 803, typically comprised of copper. In operation, the orientation of this shaft or barrel 803 is approximately vertical as seen in FIG. 8 and its coiled section points toward the container (not shown). The top end of the shaft or barrel 803 is enclosed with a cap 803B fabricated from a polymeric material that has good electrical insulation properties or low dielectric. The top surface of the cap 803B may be drilled to accommodate insertion of the vertical portion of L-shaped antenna element 801, the upper or rotating conductor/rod/antenna 801 best seen in FIG. 9. Alternatively, as described previously, a hole drilled in cap 803B can be outfitted with a sleeve of nylon, Teflon, or other structural material with good electrical insulation properties to create a topmost bearing to position and support the upper or rotating conductor/rod/antenna portion of L-shaped antenna 801 while minimizing the frictional resistance to rotation of antenna 801.

The shaft or barrel 803 is outfitted with components illustrated in FIG. 11 and FIG. 12. A pickup or receiver coil 830A (for example, of conductive 28 MAG enamel coated copper wire one layer thick) may be fabricated, for example, by employing a single layer of such small gauge coated copper wire wound on a spool fabricated of polymeric materials with good electrical insulation properties. For example, the coil 830A is placed coaxially in the shaft or barrel 803 wound on a thin-walled cylindrical polymeric tube that may be, for example, three and one half inches in length. Ends of the spool may be machined to a diameter that allows the coil spool to slide coaxially into the shaft or barrel 103 creating a light press fit. If necessary, the coil 830A and spool may be caused to adhere to the sides of the barrel 803 using adhesive or other bonding material.

Two circular disks 835B1 and 835B2 may be cut from polymeric material with good electrical insulation properties such as nylon, Teflon, or PVC. These may be machined to a diameter that slides into the shaft or barrel 103 to create a snug press fit or adhesive may be used to position the disks 835B1 and 835B2 within barrel 803. A hole may be bored through the center of the circular planar surface of each disk for receiving the vertical portion of L-shaped antenna 801 so that L-shaped antenna element 801, pick-up coil 830A, and shaft or barrel 803 are configured in a coaxial arrangement. Pick-up coil 830A may comprise several hundred turns of fine gauge wire and be between three and five inches long, preferably, for example three and one half inches long. These disc holes may be slightly greater than the diameter of the vertical portion of the upper or rotating conductor/rod/antenna 801. Thus, the holes kept aligned along the centerline of the shaft or barrel 803 serve as a sleeve bearing allowing antenna 801 to rotate with minimal frictional resistance.

To fix the vertical position of the vertical portion of antenna 801, as may be desired, the upper or rotating conductor/rod/antenna 801 within the shaft or barrel 803, the rounded lower end of the vertical portion of the vertical portion of antenna 801 may rest and be supported on a platform 803D installed near the lower end of barrel 803 proximate and pointing to the cage 804. This platform 803D may consist of a narrow strip of hard-surfaced, structural material with good electrical insulation properties such as PVC, spans the diameter of barrel 803, and may be affixed to the sidewalls of barrel 803 with adhesive or other bonding material. The hard surface of the platform 803D combined with the rounded lower end of the vertical portion of antenna 801 leaves antenna 801 free to rotate with little frictional resistance. Further, the platform 803D provides direct open-air access to that segment of the vertical portion of antenna 801 that extends below the lower bearing body 803D.

The Faraday cage 804 may be seen in FIG. 8 having a cap 805 which may form a container for an object of interest. Cage 804 may be fabricated from molded copper, copper plate, copper sheet, copper mesh, or copper fabric into a shape so as to function as a Faraday cage capable of isolating a specimen or sample from external electromagnetic fields, both those naturally occurring and those that may be induced. The Faraday cage 804 attaches to the bottom of the shaft or barrel 804 and channels electromagnetic field radiation from a body of interest up to the antenna element 801 in barrel 803. This Faraday cage 804 may be fabricated in a range of lengths and diameters with the smallest diameter being equal to that of the shaft or barrel 803. A lid 805 appropriate to the geometry of the open end of cage 804 is crafted of a lightweight polymeric material to enclose the bottom side of the Faraday cage 804.

The two ends of the coil winding wire 830A (in FIG. 11) are affixed to connector pins 812C1 and 812C2 installed at the two points near to top of the shaft or barrel 803 as indicated in FIG. 12 and holes 812A and 812B on FIG. 8. Both the connector pins and the coil wire leads are electrically isolated from the shaft or barrel 803 so as to conduct to the oscilloscope 825 for viewing its output signal and processing its properties. Leads 810A and 810B extending from the two connector pins on or in the shaft or barrel 803 connect the sensor consisting of groups or assemblies 802, 802, 803, and 804 (FIG. 8) to include lid 805 if used to the signal processing and display unit 825, most conveniently, an oscilloscope. The signal processing and display unit 825 monitors and records electrical output of the coil 830A contained in the shaft or barrel 803 in relation to the antennae 801 and 802. For initial testing and operations, the signal processing and display unit 825 was a laboratory oscilloscope set as seen in FIG. 13.

Figure 13:
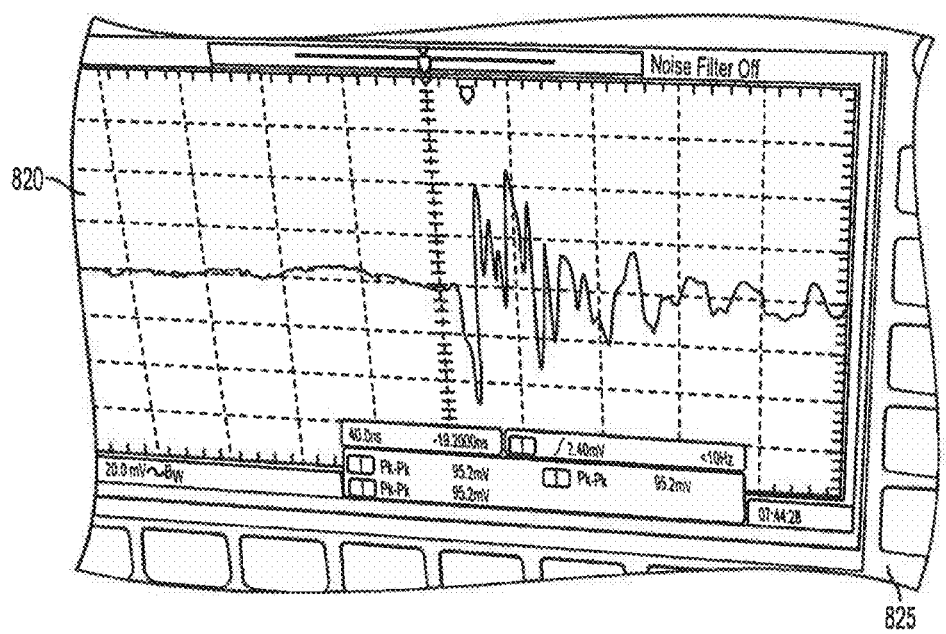

Referring to FIG. 13, there is shown an oscilloscope 825. The presence of gunpowder is detected and indicated by the waveform to the right of the steady state wave form at the left when gunpowder is brought into proximity of the antenna that may be stationary or the upper antenna element 101, 801 mobile and pointing generally toward it. Signal magnitude increases as the antenna is pointed toward a like object of interest (direction) and proximity (distance).

Alternatively, the coil 830A described above can be replaced by another coil of similar design and configuration but repositioned so as to surround the specimen or sample in the Faraday cage 104 and may be tuned to a desired frequency. Again, the broader the signature electromagnetic field spectrum, the more likely an object of interest may be uniquely detected and located.

Operation of the Device

Operation in a stationary, fixed position mode enables sensing and detection of target items, objects, or packages as those items, objects, or packages are moved, carried, conveyed, or transported to a position near the sensor device 800.

Stationary (Fixed) Operation with No Hands-on Operator

Operation as a stationary device for detecting an approaching, passing, or proximate moving target item, substance, or material will now be discussed. The device 801 may be affixed in a rigid holder with the shaft or barrel 803 oriented vertically and the open end of the Faraday cage 804 facing downward. Best results may be achieved when the device 800 is affixed at an elevation above that of the target, but having the device 800 at an elevation above the level of the target is not mandatory. For example, if the device 800 is to be used to determine if individuals walking along a prescribed path may be carrying a particular target item, substance, or material, the device should ideally be positioned overhead of the approaching and passing foot traffic. Likewise, overhead positioning is preferred if screening cars, trucks, boats, and other transport modes for the presence of a target item, substance, or material. The same applies to screening passing luggage, containers, and packages at a border or airport.

In operating position, the upper or rotating conductor/rod/antenna 801 may be resting in equilibrium directly above the lower, stationary conductor/rod/antenna 802. The signal processing and display unit 825 can be an incorporated component of the device 800 or it can be connected to the pins on the shaft or barrel 803 with extended wire leads to allow remote monitoring. A sample of the item, substance, or material being sought, or a sample containing a significant component of the makeup of the item, sample, or material being sought is placed in the Faraday cage 804 as a reference for the device 800 and its inherent electromagnetic radiation signature captured by antenna 801. That sample is retained in the Faraday cage 804 during device operation by placing the lid 805 onto the open bottom side of the Faraday cage 804 or by suspending or securing the sample between the walls of the Faraday cage 804 using a material with good electrical insulation properties.

A target item, substance, or material that approaches, passes, or moves proximate to the device 800 will now be detected by the oscilloscope 825 set to receive electromagnetic signals from the coil 830A. FIG. 13 shows a typical trigger response appearing on oscilloscope 825, the signal processing and display unit, immediately after the device 800 detects the presence of the target substance by, for example, processing the received and displayed electromagnetic field signal.

In alternative operation, the unique electromagnetic field signature associated with the target item, substance, or material can be electronically projected into the Faraday cage 804 to modulate the upper or rotating conductor/rod/antenna 801 and be detected by coil 830A.

Operation as a stationary device in a moving transporter will now be described for detecting, sensing and/or locating either a stationary or moving target item, substance, or material. As described above, a stationary installation of the device 800 can be made in a transporter such as a moving vehicle. The transporter then can carry the sensing device 800 along paths or to areas of interest in searching for items, objects, substances, and materials of interest. If a device operator is aboard the transporter carrying the installed device 800, data monitoring is generally the same as described above for stationary operation. If the operator cannot be onboard, as with an unmanned aerial vehicle (or drone), data monitoring and assessment can be performed remotely.

In-motion (portable) operation in the hands of an operator (without the electronic readout device) will now be discussed briefly, for example, operation while walking to locate a target item, object, or substance will be discussed with reference to FIG. 15. A sample of the item, substance, or material being sought, or a sample containing a significant component of the makeup of the item, sample, or material being sought is placed in the Faraday cage 804 as reference for the device 800 carried by the operator as shown. That sample is retained in the Faraday cage 804 during device 800 operation by placing the lid 805 onto the open bottom side of the Faraday cage 804 or by suspending or securing the sample between the walls of the Faraday cage 804 with a material that has good electrical insulation properties.

Figure 15:
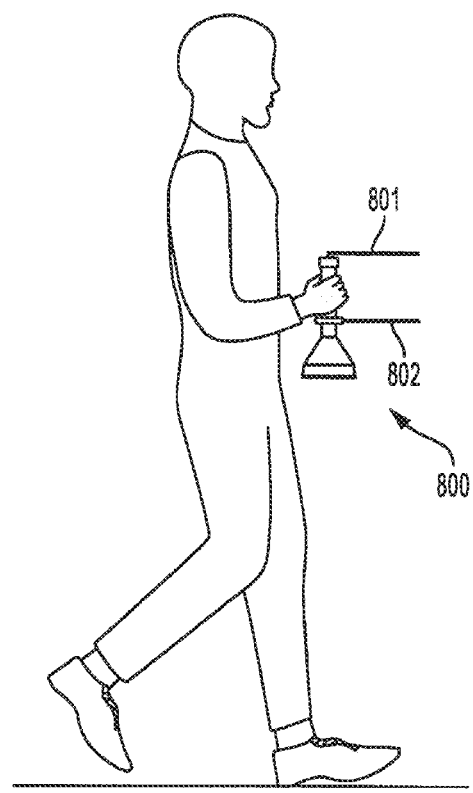

The device 800 may be conveniently supported in the palm of the hand with the fingers wrapped around the shaft or barrel 803 as indicated in FIG. 15. The shaft or barrel 803 of the device 800 is held near the torso of the body with barrel 803 oriented in a near vertical position and with the lower, stationary conductor/rod/antenna 802 pointing directly ahead along the proposed path of travel.

The operator thus holding the device 800 then walks at a normal pace, being careful to keep the device properly oriented during travel. As the operator nears the target item, sample, or material, the upper or rotating conductor/rod/antenna 801 will indicate detection by rotating either clockwise (to the right) if the target is situated to the right of the path of traverse of the operator or counter-clockwise (to the left) if the target is situated to the left of the path of traverse of the operator. Based upon the movements of the horizontal portion of the L-shaped upper or rotating conductor/rod/antenna element 801, the operator can adjust the path of travel as necessary to zero-in on the target item, sample, or material. As the operator moves over and passes the target item, sample, or material, the upper or rotating horizontal conductor/rod/antenna 801 will swing around toward the operator; that is, the upper or rotating conductor/rod/antenna 801 will rotate 180 degrees from its normal "straight ahead" position when the target object is passed. The operator then backs up, as before, and locates the target object so that the antenna 801 points toward it.

Handheld operation from a transporter to locate a target item, object, or substance on the move or stationary will now be described. A sample of the item, substance, or material being sought, or a sample containing a significant component of the makeup of the item, sample, or material being sought is placed in the Faraday cage 104 as before as reference for the device 800. That sample is retained in the Faraday cage 804 during device operation by placing the lid 805 onto the open bottom side of the Faraday cage 804 or by suspending or securing the sample between the walls of the Faraday cage 804 with a material that has good electrical insulation properties.

The device 800 may be supported in the palm of the hand with the fingers wrapped around the shaft or barrel 803 as indicated in FIG. 15. The shaft or barrel 803 of the device 800 may be held near the torso of the body with the barrel 803 oriented in a near vertical position and with fixed antenna 802, the lower, stationary conductor/rod/antenna, pointing directly ahead along the proposed path of travel.

The operator may be standing or seated as is appropriate for the transporter. In either instance, the device 800 is to be maintained in close proximity to, but not touching, the torso of the operator. The transporter carrying the operator then proceeds to translate along the chosen path and keep an eye on the antenna 801 and the reaction of oscilloscope 825 if used.

As the transporter moves along, the operator must be diligent to keep the device 800 properly oriented during travel. As the transporter carrying the operator nears the target item, sample, or material, the upper, horizontal or rotating conductor/rod/antenna 801 and the reaction of an oscilloscope 825 if used will indicate detection by rotating either clockwise (to the right) if the target is situated to the right of the path of traverse of the operator or counter-clockwise (to the left) if the target is situated to the left of the path of traverse of the operator. Based upon the movements of the upper or rotating conductor/rod/antenna 801, the travel path of the transporter is then adjusted as necessary to zero-in on the target item, sample, or material. As the operator moves over and passes the target item, sample, or material, the upper or rotating conductor/rod/antenna 801 may swing around toward the operator, that is, the upper or rotating conductor/rod/antenna 801 may rotate 180 degrees from its normal "straight ahead" position. If so, the operator should move backwards in the transporter to recover direction of the target item.

In-motion (portable) operation of the device 800 equipped with electronic readout 825 will now be described in further detail. Operation while walking or riding to locate a target item, object, or substance will now be described using oscilloscope 825. Operation in this mode is executed as in above, except that the instrument 825 is monitored electronically. In particular, the portable electronic monitor 825 also carried by the person operating the detection device 800 displays or may record in processor memory response of the coil 830A embedded in the shaft or barrel 803 to the object in the cage 804 with reference to the target object within a geographic area approached by a transporter.

Alternatively, the electronic monitor 825 described above can be replaced by any electronic device that provides an indication or alert to the operator; and the coil 830A can be replaced by any device that that identifies or detects the unique frequency signature component of the item, substance, or material in the Faraday cage 804 or its electronic simulant.

Handheld operation from a transporter to locate a target item, object, or substance is similar to that described above. Operation in this mode is the same as above except that both operator and device are moved by a transport vehicle, thus eliminating the walking.

Alternatively, the electronic monitor, for example, oscilloscope 825, described above can be replaced by any electronic device that provides an indication or alert to the operator; and the coil 830A can be replaced by any device that that identifies or detects the unique frequency signature component of the item, substance, or material in the Faraday cage 804 or its electronic simulant so long as the spectrum is sufficiently wide in bandwidth to make the signature unique.

Results, Findings, and Observations

The following assertions with respect to embodiment 800 are made:

Assertion 1.

The device 800 can detect, sense the presence of, and locate items, objects, or packages comprised of or containing a specified material or substance characterized as having a crystalline lattice structure, including, but not limited to those that are piezoelectric.

Assertion 2.

When a given formulation of a material is a mixture made up of two or more materials, the device 800 can be used to detect, sense the presence of, and locate a component of that material provided that a component of the mixture is characterized as having a crystalline lattice structure. For example, propellants used in modern ammunition vary widely. However, a common component of most ammunition propellant is potassium nitrate ($KNO_3$). Thus, potassium nitrate may be used as the target material in searching for or seeking to detect ammunition propellant.

Assertion 3.

If the mixture being targeted is comprised of two or more materials, each component material thereof being characterized by a crystalline lattice structure, the device 800 will generally give preference to the component material having the greatest density.

Assertion 4.

Each material characterized as having a crystalline lattice structure emits, gives off, and produces a unique electromagnetic signature according to a detected electromagnetic spectrum. That means that the reference sample in the Faraday cage 804 of the device 800 and the material being sought produce identical or near-identical electromagnetic spectral signatures. The identical or near-identical signatures allow for material-to-material communication through this device 800. Further, the unique signature of materials having crystalline lattice structures may be enhanced by external frequency stimulation. A preferred low frequency excitation is on the order of less than 1 Hz to 60 Hz and preferably 7 Hz to 8 Hz (near the Schuman resonance frequency) by an external source that may be an external loop coil proximately located and may be coaxial with the device barrel.

Assertion 5.

The device 800 can detect, sense the presence of, and locate piezoelectric materials without having a sample of subject material in the Faraday cage 804. For example, bone is piezoelectric; thus, the device will react to the presence of bone with the Faraday cage 804 empty and open (no lid 805).

Assertion 6.

When the device 800 is carried or held by an operator during hand-held operation, the body of the operator may act as an additional antenna providing energy to excite the sample contained in the Faraday cage 104, thus stimulating the production of the unique electromagnetic signature associated with subject material. The body of the operator also acts as an antenna to concentrate electromagnetic fields generated by the earth's core, thus serving to excite the sample contained in the Faraday cage 804.

Assertion 7.

The distance at which the device 800 will detect and alert on target item, object, or package increases as the relative velocity between the device 800 and the target is increased. This assertion anticipates that the device 800 may be moving when carried by a walking operator, be held by an operator in a moving transporter, or be fixed within a moving transporter. Likewise, the target may be moving if said target is carried on the person of an individual traveling on foot or if said target is transported in, on, or attached to a vehicle or an occupant thereof. Finally, the assertion anticipates that both device and target may be moving or that either may be stationary.

Assertion 8.

If the device 800 is positioned above the target, that is, if the device is elevated above the plane containing the target, the vertical distance from the device to the target, or the difference in elevation, has little affect upon the detection response and apparent strength of the signature signal.

Assertion 9.

Sensing, detecting, and locating a target material with the device 800 is based upon coordination, interaction, and/or matching of the unique electromagnetic signature of the sample in the Faraday cage 804 with that identical or near-identical electromagnetic signature or frequency associated with the target, the target being comprised of the same crystalline lattice structure material as the sample. Other devices capable of seeking out or detecting the unique electromagnetic signature of the target material could also be used as the detector unit.

Assertion 10.

The physical and dimensional configuration of the device 800 can take on many and various forms as long as the upper or rotating conductor/rod/antenna 101 is inductively coupled to the electromagnetic signature generated in the Faraday cage 104 containing the target sample.

Use of Fixed Magnetic Field During Device Operation

Figure 14:
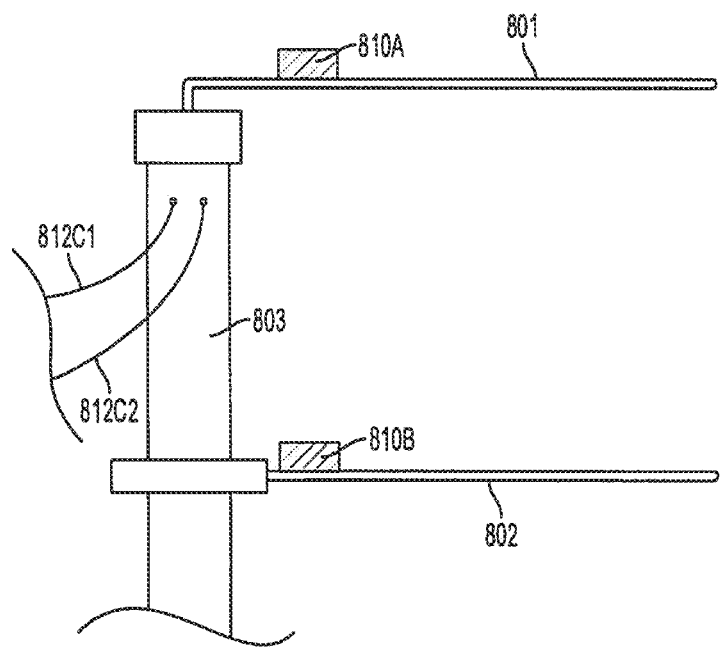

The device 800 has been operated with a small rare earth magnet 810A, 810B positioned on each of the upper or rotating conductor/rod/antenna 801 and the lower, stationary conductor/rod/antenna 802 as shown in FIG. 14. Tests revealed that best performance was achieved when the two magnets were aligned with each other vertically and positioned on each of the upper antenna element 801 and lower antenna element 802 the distal ends relative to the shaft or barrel 803 near the centerline of the shaft or barrel 103. The magnets 810A, 810B should be of similar size, magnetic strength and orientation (N/S) to achieve results. While the magnets 810A, 810B can improve detection efficiency and device sensitivity, these magnets are not required for operation of the device 800.

Examples of Objects, Substances, and Materials Actually Detected or Located in Tests of the Device The following are exemplary objects and materials successfully detected, sensed and located by the present device and other objects may be located which have not been attempted yet: human and animal bone; human DNA; genetically linked flora; gun powder, propellants, and explosives; pharmaceuticals and narcotics (e.g., methamphetamine, OxyContin, Xanax); U. S. currency and other special paper, coins; precious, semi-precious, and rare earth metals; precious and semi-precious jewels; and piezoelectric materials among others not yet tried.

A Third Embodiment Having First and Second Antennae Fixed in Parallel Relation

A third embodiment or embodiments may have the first antennae 101, 801 fixed in place so as to be parallel to the second antennae 102, 802. In these embodiments, the antenna 101, 801 is in fixed relation to one another such that they are parallel to one another. Antennae 102, 802 are already fixed. Cap 103B, 803B may pinch L-shaped antennae elements 101, 801 so as to fix them in place with respect to being in parallel with first antennae 101, 801. Moreover, spacers 103C, 835B1 and 825B2 may be drilled such that they firmly grasp the second L-shaped antennae 101, 802. The received electromagnetic signal by one of magnetometer 620 via controller 600 or oscilloscope 825 from coil 830a help the operator to point the device 100, 800 in the direction of a target object or material by increasing magnitude of the received signal.

Figure 16:
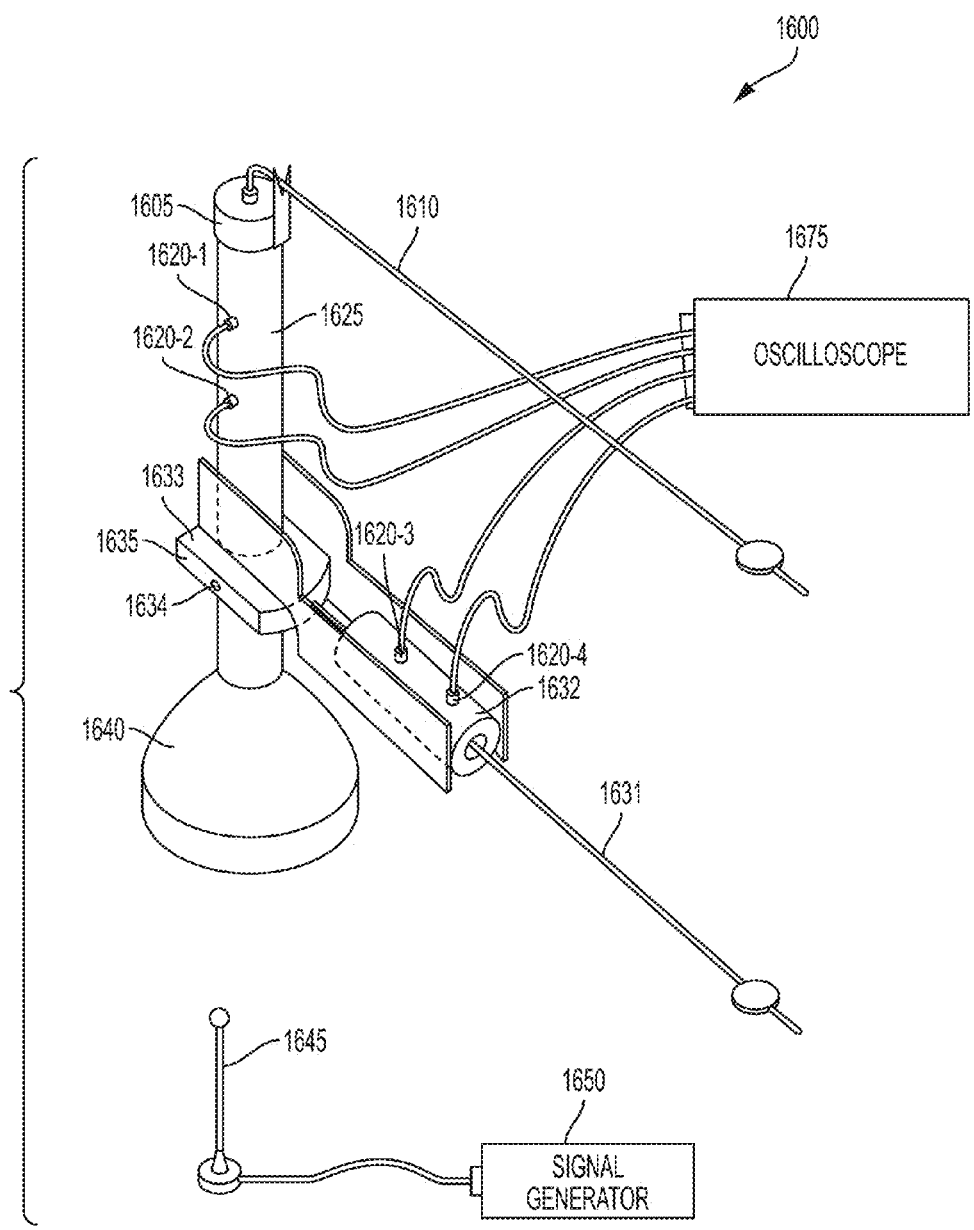
FIGS. 16-21 show details of a demonstration embodiment as flows.

A Fourth Embodiment Having First and Second Antennae in Parallel Relation, Each Antenna Having its Own Coil and the Coils Receiving an Electromagnetic Field (EMF) Signal Emitted by an Antenna Connected to an EMF Signal Generator FIG. 16 shows a perspective view of a demonstration embodiment 1600 (fourth embodiment) of an object detector, sensor and locator comprising a moveable antenna 1610, a cap portion 1605 to a barrel portion 1625, a stationary antenna portion 1630 comprising a holder 1633, a detector coil section 1632 with leads to an oscilloscope 1675, and a container cone section 1640 located at the bottom of the barrel section 1625 for receiving a certain object to be detected. Also shown, is a signal generator 1650 and antenna 1645 for generating an electromagnetic signal and transmitting the signal via an antenna 1645 for reception by coils of the embodiment. The oscilloscope 1675 is connected to leads from each of coil sections 1624 and 1632.

Figure 17:
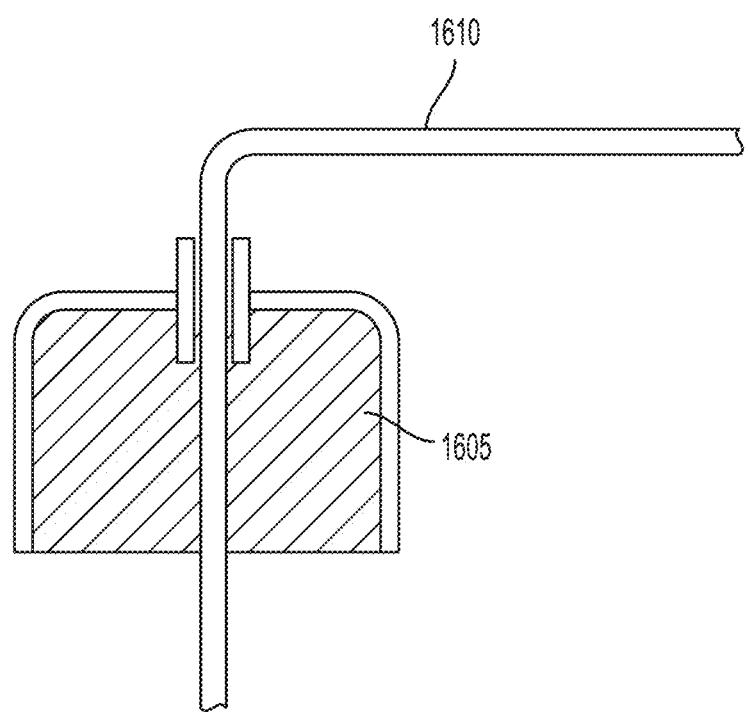

FIG. 17 shows the cap portion 1605 having insulation and turn section (unnumbered) for permitting the moving antenna portion 1610 to move and point in any direction without passing electromagnetic signals to the barrel 1625. The insulation and turn section, as suggested above, may comprise Teflon or other movement permitting substance or structure to permit moveable antenna 1610 to freely move while stationary antenna portion 1630 is fixed to barrel portion 1625.

Figure 18:
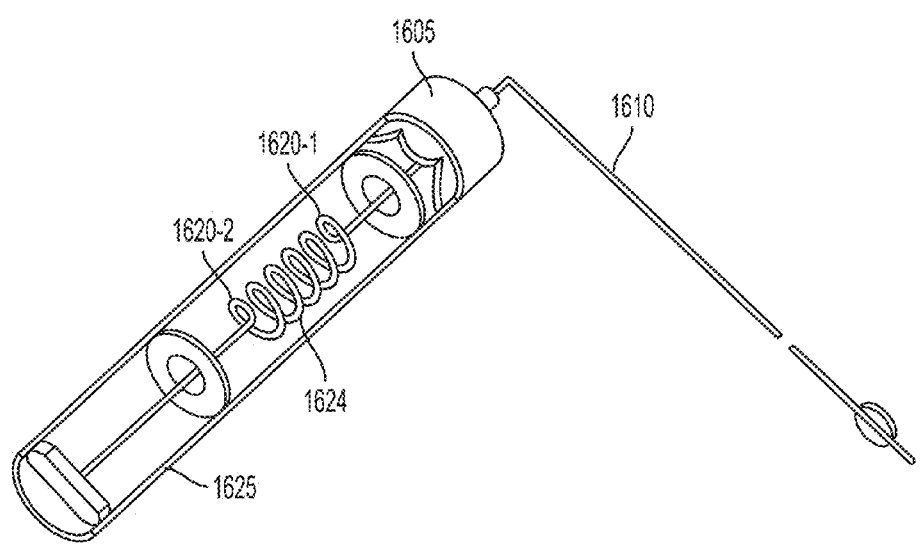

FIG. 18 shows the barrel portion 1625 which is connected to the container cone section 1640. The barrel portion 1625 receives via coil 1624 any electromagnetic signals generated by antenna 1645 or emitted by a certain object in the container cone section 1640 at one end and any signals received by moveable antenna section 1610 at the other.

Figure 19:
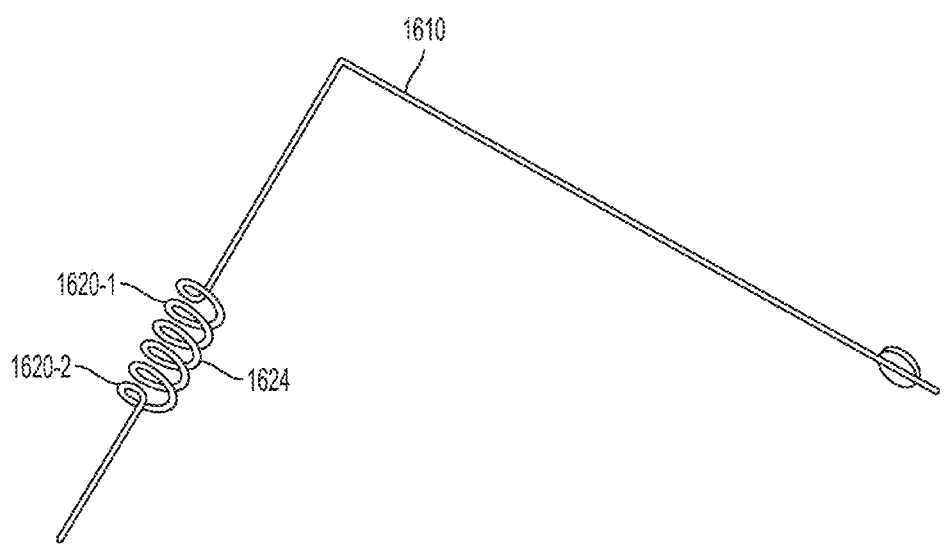

FIG. 19 shows the moveable antenna section 1610 in some detail with coil 1624 and leads 1620-1 and 1620-2 to be graphically shown on oscilloscope 1675.

Figure 20:
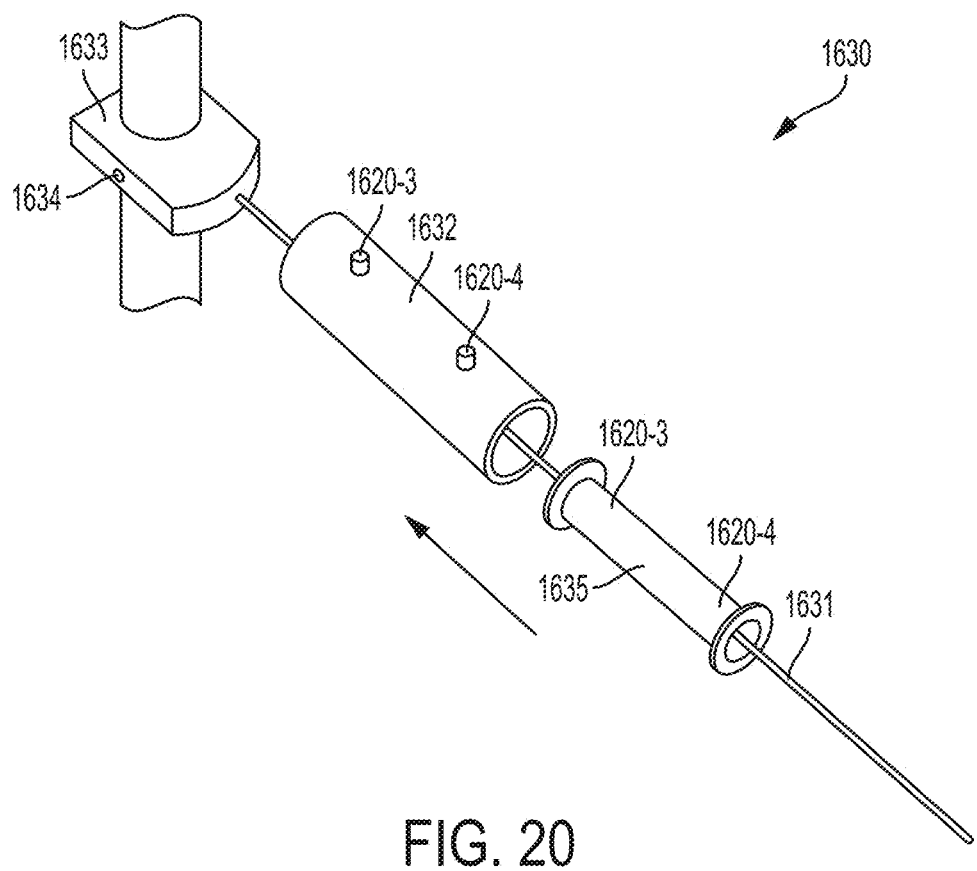

FIG. 20 shows details of fixed antenna arm 1630 showing coil portion 1635 moved from its normal position inside coil protector 1632 to the right, an arrow shows the direction of replacing coil portion to the inside of coil protector 1632. Leads from the coil portion 1635 provide an input to oscilloscope 1675.

Figure 21:
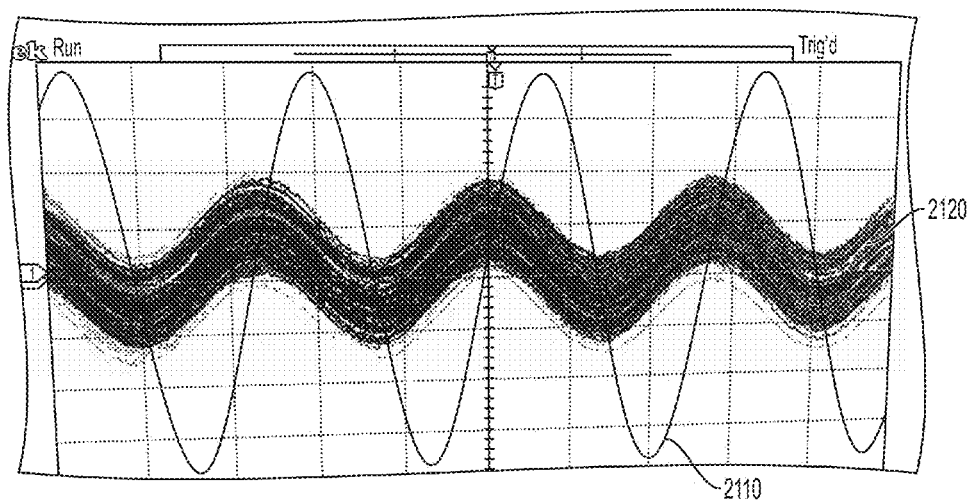

FIG. 21 shows the output of an oscilloscope 1675 as displayed from inputs from coils 1624 and 1632 when a certain object identical to an object contained in the container cone section 1640 is not in the vicinity of the apparatus of FIG. 16 but may be contained in a Faraday cage or otherwise hidden.

Signal Analysis of Demonstration Embodiment 1600

Laboratory tests and instrument demonstrations focused on remote, at-a-distance, non-invasive detection of gunpowder. A small sample (less than a half teaspoon) of commercially-available smokeless gunpowder (or salt peter) commonly used for reloading spent ammunition for subsequent use in small arms was placed in the conical-shaped faraday cage 1640 located at the bottom end of the demonstration instrument 1600. The sample was attached to the inside walls near the top of the Faraday cage 104, 804 and, referring to FIG. 16, cage 1640, close to, but not touching, the lower end of the antenna within the vertical barrel of the instrument. A similar quantity of the gunpowder was placed in a plastic bag to serve as the target material to be remotely detected by the unit.

The single dipole antenna 1645 placed directly below the open end of the Faraday cage was used to excite the system. For the tests described herein, the excitation signal was a continuous sine wave driven at 18.5 megaHertz but may be sample driven and be, for example, a selected frequency within a range of 10 to 20 MHz. In earlier embodiments explained above, low frequency excitation signals were introduced by a signal generator. The amplitude of the excitation signal emanating from the signal generator 1650 and feeding a 50-ohm impedance single dipole antenna 1645 may be, for example, 500 mV peak-to-peak.

FIG. 21 illustrates the signals that are displayed on a Tektronix 3012 Mixed Domain Oscilloscope 1675 from both the excitation circuit 2110 and the acquisition of the receiving signal 2120. Graphs of data extracted from the receiver coils, 1624, 1635, surrounding both the vertical and horizontal antennas 1610, 1631 were constructed. Note that the uniform, well-defined driver signal 2110 is displayed with an amplitude multiplier of 100 millivolts per division and a time scale of 20.0 nanoseconds per division. The signal emanating from the receiver coils 2120 is shifted in phase relationship with the driver signal 2110 and displayed at 10 millivolts per division. Coil signal 2120 is clearly a sine wave with a frequency exactly corresponding to that of the drive signal. Equally obvious is the fact that the signal 2120 is comprised of a single signal that is moving up and down in the vertical plane. The visible striations of signal 2120 indicate the time density that the signal is in a given amplitude range (v(t)) as represented on the vertical axis. Three like signal dense bands (or three complete cycles) are clearly visible on the oscilloscope within the composite signal 1620, those dense bands being surrounded by striations that are considerably less dense.

To identify the change in signal that occurs when a target material matching the material sample inside the Faraday cage 1640 is detected, the signal 1620 accruing to the receiver coils 1624, 1635 was sampled both (1) when no target substance was present in the vicinity of the instrument (the sample substance was contained in a separate Faraday cage (not shown)) and (2) when target substance was brought into the field of view of the instrument 1600.

Sample interval of the high-speed data acquisition system was set at 2.5 gigaHertz (two orders of magnitude greater than the Nyquist frequency). Record length for each test was set at 1,000,000 providing a total sample duration of 0.4 mS for each observation. The signal amplitude for the vertical scale on the display was set to allow full-scale analog input of ±50 millivolts. Tests with and without the target material being present were replicated six times.

As one skilled in the art will be aware, peak root mean square (rms) is the height of the individual peak amplitude values relative to a moving rms average of the signal amplitude; it is a measure of signal dynamics). Signal movement is clearly evident in FIG. 1. Following is a table, TABLE I, comparing the $\Sigma_{Vpeak,(rms)}$ values for the six replication of the test described above.

TABLE I

Peak Root Mean Square Values

| WITHOUT Target Material, Namely, Gunpowder, Near The Instrument | WITH Target Material, Namely, Gunpowder, Near the Instrument |
|---|---|
| 1.793 | 1.838 |
| 1.784 | 1.878 |
| 1.755 | 1.866 |
| 1.890 | 2.014 |
| 1.800 | 1.815 |
| 1.842 | 1.992 |

When the target material being sought was in the field of view of the instrument, the peak rms value of the signal was consistently higher than when no target material was near the instrument. This observation held true for signal analyses for a series of two replicated tests with and without the target material, gunpowder, within the field of view of the instrument. In this instance, ten million (10,000,000) contiguous data points were collected and analyzed for each test. Sampling rate was the same as when collecting the one million (1,000,000) data points in the tests outlined above. See Table II below:

TABLE II

Peak Root Mean Square Values

| WITHOUT Target Material, Namely, Gunpowder, Near The Instrument | WITH Target Material, Namely, Gunpowder, Near the Instrument |
|---|---|
| 2.203 | 2.435 |
| 2.261 | 2.550 |

Why does Device 1600 Work?

Naturally occurring electromagnetic radiation along with generated electromagnetic radiation (cellular communications, wireless networks, microwave communications systems, and so forth) present in the area may enter the instrument faraday cage through the bottom opening, pass near the suspended target material sample, and move upward along the antenna in the vertical shaft. In earlier embodiments, the system was totally passive with no external RF energy. To strengthen the signal-to-noise ratio and consistency of operation, the electromagnetic signal spectra entering the faraday cage was enhanced by adding a low-power RF source with a single dipole antenna set to emit a constant frequency of 18.5 megahertz directly below the faraday cage entrance.

This electromagnetic radiation interacts with the material sample placed in the faraday cage, causing the sample to emit radiation as is characteristic of many spectroscopy applications. This radiation emitted by the material in the faraday chamber is added to the RF source noted above. Signals generated in the faraday cage are transmitted from the instrument via the top antenna element. The radiation emanating from this upper antenna element, including the signal emitted by the target material contained in the faraday cage, may impinge upon a target material sample that is in the instrument field of view. Signals emanating for the target substance are received by the instrument antenna system, cause a perturbation of the signal appearing on the screen of the data recorder. Comparative analyses of these signal perturbations indicate whether a material like the one in the faraday chamber has been located.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A detector, sensor and locator device for use in locating a target item comprising, the device comprising
    an approximately cylindrical housing adapted to be positioned vertically, the housing having a cap at a top end for receiving an L-shaped antenna supported by a support member fixed to the cylindrical housing,
    the housing having a larger diameter Faraday cage affixed to the lower end thereof for receiving an object of interest, the Faraday cage being larger in cross-sectional diameter that the approximately cylindrical housing and being conical in shape so as to direct electromagnetic radiation from the object in the Faraday cage toward the cylindrical housing,
    the Faraday cage for precluding penetration of external electromagnetic fields and for channeling electromagnetic radiation emitted by an object under investigation in the Faraday cage to the cylindrical housing and to the L-shaped antenna having a rotating horizontal portion, and
    a further fixed antenna portion being mounted horizontally to the cylindrical housing and for pointing in a direction of interest.

2. The detector, sensor and locator device of claim 1 further characterized by a first magnetometer mounted to the further fixed antenna for receiving an electromagnetic field of the device.

3. The detector, sensor and locator device of claim 1 further characterized by a first and a second magnet of similar size, polarity and orientation for enhancing a magnetic field of the device.

4. The detector, sensor and locator device of claim 1 further comprising a pickup coil of wire wound around a spool and housed in the housing but permitting passage there-through of the L-shaped antenna.

5. The detector, sensor and locator device of claim 1 wherein the object under investigation comprises a crystalline lattice structure.

6. The detector, sensor and locator device of claim 2 wherein the magnetometer is connected to one of a controller and to a personal computer for obtaining a display of an electromagnetic field and an oscilloscope.

7. The detector, sensor and locator device of claim 1 wherein the device is stimulated by an external loop coil having a very low frequency wave or is pulsed on the order of less than one Hz to twenty Hz and comprises a signal generator and an antenna for emitting the wave, the wave comprising an electromagnetic field.

8. The detector, sensor and locator device of claim 7 wherein the very low frequency wave or pulsing has a frequency on the order of seven or eight Hz.

9. The detector, sensor and locator device of claim 1 wherein the first and second antennae are fixed and parallel to one another and electrically isolated from the barrel.

10. The detector, sensor and locator device of claim 1 being between 3 and 20 inches in length between the Faraday cage and the top of the L-shaped antenna element.

11. The detector, sensor and locator device of claim 4, the wire wound around the spool being between fine gauge 28 MAG enamel coated copper wire one layer thick and approximately three to five inches in length.

12. The detector, sensor and locator device of claim 1, the object under investigation comprising DNA.

13. The detector, sensor and locator device of claim 1, the object under investigation comprising an explosive material.

14. The detector, sensor and locator device of claim 1, the object under investigation comprising a particular drug.

15. The detector, sensor and locator device of claim 1, the L-shaped antenna comprising between 18 gauge and 12 gauge wire.

16. The detector, sensor and locator device of claim 5 wherein the crystalline substance comprises piezoelectric material.

17. The detector, sensor and locator device of claim 5 wherein the crystalline lattice structure comprises ammunition.

18. A method of operating a detector, sensor and locator device, the detector, sensor and locator device comprising an approximately cylindrical housing adapted to be positioned vertically, the housing having a cap at a top end for receiving an L-shaped antenna comprising a barrel coil supported by a support member fixed to the housing; the housing having a larger diameter Faraday cage affixed to the lower end thereof for receiving an object of interest; the Faraday cage for precluding penetration of external electromagnetic fields and for channeling electromagnetic radiation emitted by an object under investigation to the cylindrical housing and to the L-shaped antenna having the coil in a vertical section and a rotating horizontal portion; and
    a further fixed antenna portion being mounted horizontally to the cylindrical housing and for pointing in a direction of interest comprising a coil, the method comprising
    monitoring a signal from one of a magnetometer mounted to the fixed antenna or a signal from the coils on an oscilloscope, the coils each wrapped around a spool located respectively inside and outside the barrel and,
    by signal analysis, moving the device in the direction indicated by the strongest received electromagnetic signal indicated by root mean square value and signature waveform an oscilloscope connected to the coils.

19. A method of operating a detector, sensor and locator device, the detector, sensor and locator device according to claim 18 comprising
    placing an object of interest in the Faraday cage, the Faraday cage having a lid for receiving the object of interest and the lid comprising a non-conductive material.

20. A method of operating a detector, sensor and locator device, the detector, sensor and locator device according to claim 18 comprising
    suspending an object of interest in the Faraday cage, the Faraday cage being open at the bottom.

* * * * *